US012211173B2

(12) United States Patent
Ren et al.

(10) Patent No.: US 12,211,173 B2
(45) Date of Patent: *Jan. 28, 2025

(54) LAPRAN: A SCALABLE LAPLACIAN PYRAMID RECONSTRUCTIVE ADVERSARIAL NETWORK FOR FLEXIBLE COMPRESSIVE SENSING RECONSTRUCTION

(71) Applicant: ARIZONA BOARD OF REGENTS ON BEHALF OF ARIZONA STATE UNIVERSITY, Scottsdale, AZ (US)

(72) Inventors: Fengbo Ren, Tempe, AZ (US); Kai Xu, Tempe, AZ (US); Zhikang Zhang, Mesa, AZ (US)

(73) Assignee: ARIZONA BOARD OF REGENTS ON BEHALF OF ARIZONA STATE UNIVERSITY, Scottsdale, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/045,740

(22) Filed: Oct. 11, 2022

(65) Prior Publication Data
US 2023/0075490 A1  Mar. 9, 2023

Related U.S. Application Data

(62) Division of application No. 16/745,817, filed on Jan. 17, 2020, now Pat. No. 11,468,542.
(Continued)

(51) Int. Cl.
*G06T 3/4046* (2024.01)
*G06N 3/045* (2023.01)
(Continued)

(52) U.S. Cl.
CPC .......... *G06T 3/4046* (2013.01); *G06N 3/045* (2023.01); *G06N 3/084* (2013.01); *G06N 20/20* (2019.01);
(Continued)

(58) Field of Classification Search
CPC .................. G06T 3/4046; G06T 5/50; G06T 2207/20016; G06T 2207/20081;
(Continued)

(56) References Cited

U.S. PATENT DOCUMENTS 8,842,891 B2 * 9/2014 Nagesh ............... G06V 40/169
382/209
9,615,024 B1 * 4/2017 Gonzalez .................. G06T 5/50
(Continued)

OTHER PUBLICATIONS

Canh, T. N., et al., "Multiscale/multi-resolution Kronecker compressive imaging," IEEE International Conference on Image Processing (ICIP), pp. 2700-2704, Sep. 2015.*
(Continued)

*Primary Examiner* — Xuemei G Chen
(74) *Attorney, Agent, or Firm* — MH2 Technology Law Group LLP

(57) ABSTRACT

This disclosure addresses the single-image compressive sensing (CS) and reconstruction problem. A scalable Laplacian pyramid reconstructive adversarial network (LAPRAN) facilitates high-fidelity, flexible and fast CS image reconstruction. LAPRAN progressively reconstructs an image following the concept of the Laplacian pyramid through multiple stages of reconstructive adversarial networks (RANs). At each pyramid level, CS measurements are fused with a contextual latent vector to generate a high-frequency image residual. Consequently, LAPRAN can produce hierarchies of reconstructed images and each with an incremental resolution and improved quality. The scalable pyramid structure of LAPRAN enables high-fidelity CS reconstruction with a flexible resolution that is adaptive to a wide range of compression ratios (CRs), which is infeasible with existing methods.

8 Claims, 7 Drawing Sheets

Related U.S. Application Data

(60) Provisional application No. 62/794,266, filed on Jan. 18, 2019.

(51) Int. Cl.
  *G06N 3/084* (2023.01)
  *G06N 20/20* (2019.01)
  *G06T 5/50* (2006.01)

(52) U.S. Cl.
  CPC ...... *G06T 5/50* (2013.01); *G06T 2207/20016* (2013.01); *G06T 2207/20081* (2013.01); *G06T 2207/20084* (2013.01)

(58) Field of Classification Search
  CPC ............. G06T 2207/20084; G06T 5/60; G06T 3/4053; G06N 3/045; G06N 3/084; G06N 20/20; G06N 3/047
  See application file for complete search history.

(56) References Cited

U.S. PATENT DOCUMENTS

| | | | |
|---|---|---|---|
| 9,654,752 B2 | 5/2017 | Baraniuk et al. | |
| 9,875,428 B2* | 1/2018 | Ramamurthy | G06F 18/21345 |
| 10,575,788 B2* | 3/2020 | Gupta | A61B 5/0006 |
| 2008/0137753 A1 | 6/2008 | He | |
| 2008/0216116 A1 | 9/2008 | Pekonen et al. | |
| 2010/0272184 A1 | 10/2010 | Fishbain et al. | |
| 2014/0029824 A1* | 1/2014 | Shi | G06T 7/0012 382/131 |
| 2014/0126617 A1* | 5/2014 | Jung | H03M 7/46 375/240 |
| 2015/0032990 A1* | 1/2015 | Markovic | G06F 9/3893 712/3 |
| 2016/0148346 A1 | 5/2016 | Bar-On et al. | |
| 2016/0205336 A1* | 7/2016 | Sato | H04N 25/772 348/322 |
| 2016/0212245 A1* | 7/2016 | Shoaib | H04L 69/04 |
| 2016/0344844 A1* | 11/2016 | Lin | H04L 67/34 |
| 2017/0041166 A1* | 2/2017 | Lin | H04L 25/03299 |
| 2017/0093603 A1* | 3/2017 | Hu | H04B 1/7103 |
| 2017/0188039 A1* | 6/2017 | Siddiqui | H04N 19/51 |
| 2017/0188813 A1 | 7/2017 | Arnold et al. | |
| 2017/0256033 A1 | 9/2017 | Tuzel | |
| 2018/0174052 A1 | 6/2018 | Rippel et al. | |
| 2018/0197046 A1* | 7/2018 | Braun | G06V 10/10 |
| 2019/0124346 A1 | 4/2019 | Ren et al. | |
| 2019/0132586 A1* | 5/2019 | Nagumo | H04N 19/124 |
| 2019/0229820 A1* | 7/2019 | Scaglione | H04B 17/23 |
| 2019/0251360 A1 | 8/2019 | Cricri et al. | |
| 2019/0318227 A1 | 10/2019 | Bronstein et al. | |
| 2020/0202160 A1 | 6/2020 | Park et al. | |
| 2020/0294201 A1 | 9/2020 | Planche et al. | |

OTHER PUBLICATIONS

Canh, T. N., et al., "Decomposition-based Multiscale Compressed Sensing", International Workshop on Advanced Image Technology (IWAIT), Jan. 2018.*

Karpathy, A. et al., "Large-Scale Video Classification with Convolutional Neural Networks", 2014 IEEE Conference on Computer Vision and Pattern Recognition (Columbus, OH, Jun. 23-28, 2014), 2014 [Date Added to IEEE Xplore: Sep. 2014], pp. 1725-1732 <DOI:10.1109/CVPR.2014.223>.

Krizhevsky, A. et al., "ImageNet Classification with Deep Convolutional Neural Networks", Advances in Neural Information Processing Systems (NIPS 2012), 2012, vol. 25, 9 pages.

Li, D. et al., "DeepRebirth: Accelerating Deep Neural Network Execution on Mobile Devices", arXiv, (v1, submitted Aug. 16, 2017), 9 pages, https://arxiv.org/abs/1708.04728v1.

Long, J. et al., "Fully Convolutional Networks for Semantic Segmentation", arXiv, (v1, submitted Nov. 14, 2014), 10 pages, arXiv:1411.4038v1.

Long, J. et al., "Fully Convolutional Networks for Semantic Segmentation", arXiv, (v2, submitted Mar. 8, 2015), 10 pages, arXiv:1411.4038.

Ma, S. et al., "Learning Activity Progression in LSTMs for Activity Detection and Early Detection", 2016 IEEE Conference on Computer Vision and Pattern Recognition (Las Vegas, NV, Jun. 27-30, 2016), 2016 [Date Added to IEEE Xplore: Dec. 2016], pp. 1942-1950 <DOI: 10.1109/CVPR.2016.214>.

Mun, S. et al., "Motion-Compensated Compressed-Sensing Reconstruction for Dynamic MRI", 2013 IEEE International Conference on Image Processing (Melbourne, Australia, Sep. 15-18, 2013), 2013 [Date Added to IEEE Xplore: Feb. 2014], pp. 1006-1010 <DOI:10.1109/ICIP.2013.6738208>.

Ng, J. et al., "Beyong Short Snippets: Deep Networks for Video Classification", 2015 IEEE Conference on Computer Vision on Pattern Recognition (Boston, MA, Jun. 7-12, 2015), 2015 [Date Added to IEEE Xplore: Oct. 2015], pp. 4694-4702 <DOI:10.1109/CVPR.2015.7299101>.

Noh, H. et al., "Image Question Answering Using Convolutional Neural Network with Dynamic Parameter Prediction", 2016 IEEE Conference on Computer Vision and Pattern Recognition (Las Vegas, NV, Jun. 27-30, 2016), 2016 [Date Added to IEEE Xplore: Dec. 2016], pp. 30-38 <DOI:10.1109/CVPR.2016.11>.

Oquab, M. et al., Is Object Localization for Free?—Weakly-Supervised Learning with Convolutional Neural Networks, 2015 IEEE Conference on Computer Vision and Pattern Recognition (Boston, MA, Jun. 7-12, 2015), 2015 [Date Added to IEEE Xplore: Oct. 2015], pp. 685-694 <DOI: 10.1109/CVPR.2015.7298668>.

Qaisar, S. et al., "Compressive Sensing: From Theory to Applications, a Survey", Journal of Communications and Networks, Oct. 2013 (Date of Publication Nov. 2013), vol. 15, No. 5, pp. 443-456 <DOI:10.1109/ JCN.2013.000083>.

Sankaranarayanan, A. et al., "CS-MUVI: Video Compressive Sensing for Spatial-Multiplexing Cameras", 2012 IEEE International Conference on Computational Photography (Seattle, WA, Apr. 28-29, 2012), 2012 [Date Added to IEEE Xplore: Jun. 2012], 10 pages <DOI: 10.1109/ICCPhot.2012.6215212>.

Sharma, S. et al., "Action Recognition using Visual Attention", arXiv, (v1, submitted Nov. 12, 2015), 11 pages, arXiv:1511.04119v1.

Xie, J. et al., "Image Denoising and Inpainting with Deep Neural Networks", Advances in Neural Information Processing Systems (NIPS 2012), 2012, vol. 25, 9 pages.

Xu, K. et al., "An energy-efficient compressive sensing framework incorporating online dictionary learning for long-term, wireless health monitoring", 2016 IEEE International Conference on Acoustics, Speech and Signal Processing ICASSP) (Shanghai, China, Mar. 20-25, 2016), 2016 [Date Added to IEEE Xplore: May 2016], pp. 804-808, <DOI:10.1109/ICASSP.2016.7471786>.

Xu, K. et al., "CSVideoNet: A Real-Time End-to-End Learning Framework for High-Frame-Rate Video Compressive Sensing", 2018 IEEE Winter Conference on Applications of Computer Vision (WACV) (Lake Tahoe, NV, Mar. 12-15, 2018), 2018 [Dale Added to IEEE Xplore: May 2018], pp. 1680-1688 <DOI:10.1109/WACV.2018.00187>.

Xu, K. et al., "CSVideoNet: A Real-Time End-to-End Learning Framework for High-Frame-Rate Video Compressive Sensing", Researchgate, May 2017 (uploaded Apr. 2017), 11 pages <https://www.researchgate.net/publication/315783235_CSVideoNet_A_Real-time_End-to-end_Learning_Framework_for_High-frame-rate_Video_Compressive_Sensing>.

Xu, K. et al., "CSVideoNet: A Real-time End-to-end Learning Framework for High-frame-rate Video Compressive Sensing", arXiv, (v3, submitted Mar. 20, 2017), 11 pages, arXiv:1612.05203v3.

Xu, K. et al., "CSVideoNet: A Real-time End-to-end Learning Framework for High-frame-rate Video Compressive Sensing", arXiv, (v4, submitted Apr. 5, 2017), 11 pages, arXiv:1612.05203v4.

Xu, K. et al., "CSVideoNet: A Real-time End-to-end Learning Framework for High-frame-rate Video Compressive Sensing", arXiv, (v5, submitted Jan. 28, 2018), 9 pages, arXiv:1612.05203v5.

(56) References Cited

OTHER PUBLICATIONS

Xu, K. et al., "CSVideoNet: A Recurrent Convolutional Neural Network for Compressive Sensing Video Reconstruction", arXiv, (v1, submitted Dec. 15, 2016), 10 pages, arXiv:1612.05203v1.

Xu, K. et al., "CSVideoNet: A Recurrent Convolutional Neural Network for Compressive Sensing Video Reconstruction", arXiv, (v2, submitted Dec. 16, 2016), 10 pages, arXiv:1612.05203v2.

Xu, K. et al., "LAPRAN: A Scalable Laplacian Pyramid Reconstructive Adversarial Network for Flexible Compressive Sensing Reconstruction", European Conference on Computer Vision 2018 (Munich, Germany, Sep. 8-14, 2018), Oct. 2018, vol. 11214, pp. 491-507 <DOI:10.1007/978-3-030-01249-6_30>.

Xu, K. et al., "LAPRAN: A Scalable Laplacian Pyramid Reconstructive Adversarial Network for Flexible Compressive Sensing Reconstruction", arXiv, (v1, submitted Jul. 24, 2018), 16 pages, arXiv:1807.09388v1.

Xu, K. et al., "LAPRAN: A Scalable Laplacian Pyramid Reconstructive Adversarial Network for Flexible Compressive Sensing Reconstruction", arXiv, (v2, submitted Jul. 28, 2018), 16 pages, arXiv:1807.09388v2.

Xu, K. et al., "LAPRAN: A Scalable Laplacian Pyramid Reconstructive Adversarial Network for Flexible Compressive Sensing Reconstruction", arXiv, (v3, submitted Nov. 28, 2018), 17 pages, arXiv:1807.09388v3.

Yang, Z. et al., Stacked Attention Networks for Image Question Answering, 2016 IEEE Conference on Computer Vision and Pattern Recognition (Las Vegas, NV, Jun. 27-30, 2016), 2016 [Date Added to IEEE Xplore: Dec. 2016], pp. 21-29 <DOI:10.1109/CVPR.2016.10>.

Applicant-Initiated Interview Summary for U.S. Appl. No. 16/165,568, mailed Jun. 8, 2020, 3 pages.

Arbeláez, P. et al., "Contour Detection and Hierarchical Image Segmentation," IEEE Transactions on Pattern Analysis and Machine Intelligence, vol. 33, No. 5, May 2011, IEEE, pp. 898-916.

Beck, A. et al., "A Fast Iterative Shrinkage-Thresholding Algorithm for Linear Inverse Problems," SIAM Journal on Imaging Sciences, vol. 2, Issue 1, 2009, Society for Industrial and Applied Mathematics, pp. 183-202.

Becker, S. et al., "NESTA: A Fast and Accurate First-Order Method for Sparse Recovery," SIAM Journal on Imaging Sciences, vol. 4, No. 1, 2011, Society for Industrial and Applied Mathematics, 39 pages.

Bevilacqua, M. et al., "Low-Complexity Single-Image Super-Resolution based on Nonnegative Neighbor Embedding," British Machine Vision Conference (BMVC), 2012, pp. 135-1-135.10.

Blumensath, T. et al., "Iterative hard thresholding for compressed sensing," Applied and Computational Harmonic Analysis, vol. 27, Issue 3, 2009, Elsevier Inc., pp. 265-274.

Bora, A. et al., "Compressed Sensing using Generative Models," Proceedings of the 34th International Conference on Machine Learning, PMLR 70, 2017, Sydney, Australia, 10 pages.

Candès, E. et al., "Compressed sensing with coherent and redundant dictionaries," Applied and Computational Harmonic Analysis, vol. 31, Issue 1, 2011, Elsevier Inc., pp. 59-73.

Candès, E. et al., "Robust Uncertainty Principles: Exact Signal Reconstruction From Highly Incomplete Frequency Information," IEEE Transactions on Information Theory, vol. 52, No. 2, Feb. 2006, IEEE, pp. 489-509.

Candès, E. et al., "Stable Signal Recovery from Incomplete and Inaccurate Measurements," Communications on Pure and Applied Mathematics, vol. 59, Issue 8, Wiley Periodicals, Inc., 17 pages.

Cui, Z. et al., "Deep Network Cascade for Image Super-resolution," In Fleet, D. et al., ECCV 2014, Part V, LNCS 8693, Springer International Publishing, pp. 49-64.

Dabov, K. et al., "Image Denoising by Sparse 3-D Transform-Domain Collaborative Filtering," IEEE Transactions on Image Processing, vol. 16, No. 8, Aug. 2007, IEEE, pp. 2080-2095.

Daubechies, I. et al., "Iteratively Reweighted Least Squares Minimization for Sparse Recovery," Communications on Pure and Applied Mathematics, vol. LXIII, 0001-0038, 2010, Wiley Periodicals, Inc., 38 pages.

Davenport, M.A., "Random Observations on Random Observations: Sparse Signal Acquisition and Processing," A Thesis Submitted in Partial Fulfillment of the Requirements for the Degree of Doctor of Philosophy, Aug. 2010, Rice University, Houston, Texas, 203 pages.

Davisson, L.D., "Book Reviews: 'Rate Distortion Theory: A Mathematical Basis for Data Compression,'" IEEE Transactions on Communications, vol. 20, No. 6, Dec. 1972, IEEE, p. 1202.

Denton, E. et al., "Deep Generative Image Models using a Laplacian Pyramid of Adversarial Networks," Advances in Neural Information Processing Systems 28 (NIPS 2015), Proceedings of the 29th Conference on Neural Information Processing Systems (NIPS), Dec. 2015, Montreal, Canada, 9 pages.

Donahue, J. et al., "Long-term Recurrent Convolutional Networks for Visual Recognition and Description," IEEE Conference on Computer Vision and Pattern Recognition (CVPR), Jun. 7-12, 2015, Boston, MA, USA, IEEE, 10 pages.

Dong, C. et al., "Image Super-Resolution Using Deep Convolutional Networks," IEEE Transactions on Pattern Analysis and Machine Intelligence, Jun. 2015, IEEE, 14 pages.

Dong, C. et al., "Learning a Deep Convolutional Network for Image Super-Resolution," In Fleet, D. et al., ECCV 2014, Part IV, LNCS 8692, 2014, Springer International Publishing, pp. 184-199.

Dong, W. et al., "Compressive Sensing via Nonlocal Low-Rank Regularization," IEEE Transactions on Image Processing, vol. 23, No. 8, Aug. 2014, IEEE, pp. 3618-3632.

Duarte, M.F. et al., "Single-Pixel Imaging via Compressive Sampling," IEEE Signal Processing Magazine, Mar. 2008, IEEE, pp. 83-91.

Duchi, J. et al., "Adaptive Subgradient Methods for Online Learning and Stochastic Optimization," Journal of Machine Learning Research, vol. 12, Jul. 2011, pp. 2121-2159.

Fowler, J.E. et al., "Block-Based Compressed Sensing of Images and Video," Foundations and Trends in Signal Processing, vol. 4, No. 4, 2012, pp. 297-416.

Glasner, D. et al., "Super-Resolution from a Single Image," IEEE 12th International Conference on Computer Vision (ICCV), Sep. 29-Oct. 2, 2009, Kyoto, Japan, IEEE, pp. 349-356.

Guo, W. et al., "EdgeCS: Edge Guided Compressive Sensing Reconstruction," Proceedings of SPIE Visual Communications and Image Processing 2010, vol. 7744, 77440L-1, Jul. 2010, Huangshan, China, SPIE, 10 pages.

He, K. et al., "Deep Residual Learning for Image Recognition," 2016 IEEE Conference on Computer Vision and Pattern Recognition (CVPR), Jun. 27-30, 2016, Las Vegas, NV, USA, IEEE, pp. 770-778.

Huggins, P.S. et al., "Greedy Basis Pursuit," IEEE Transactions on Signal Processing, vol. 55, No. 7, Jul. J007, IEEE, pp. 3760-3772.

Iliadis, M. et al., "Deep fully-connected networks for video compressive sensing," Digital Signal Processing, vol. 72, Jan. 2018, Elsevier Inc., pp. 9-18.

Ioffe, S. et al., "Balch Normalization: Accelerating Deep Network Training by Reducing Internal Covariate Shift," Proceedings of the 32nd International Conference on Machine Learning, 2015, Lille, France, 9 pages.

Kim, J. et al., "Accurate Image Super-Resolution Using Very Deep Convolutional Networks," 2016 IEEE Conference on Computer Vision and Pattern Recognition (CVPR), Jun. 27-30, 2016, Las Vegas, NV, USA, IEEE, pp. 1646-1654.

Kingma, D. et al., "Adam: A Method for Stochastic Optimization," arXiv: 1412.6980v9, Jan. 30, 2017, published as a conference paper at ICLR 2015, 15 pages.

Kulkarni, K. et al., "ReconNet: Non-Iterative Reconstruction of Images from Compressively Sensed Measurements," 2016 IEEE Conference on Computer Vision and Pattern Recognition (CVPR), Jun. 2016, IEEE, 10 pages.

Lai, W.S. et al., "Deep Laplacian Pyramid Networks for Fast and Accurate Super-Resolution," 2017 IEEE Conference on Computer

(56) References Cited

OTHER PUBLICATIONS

Vision and Pattern Recognition (CVPR), Jul. 21-26, 2017, Honolulu, HI, USA, IEEE, pp. 5835-5843.
Lecun, Y. et al., "Efficient BackProp," In Montavon, G. et al., Neural Networks: Tricks of the Trade, 2nd edition, LNCS 7700, 2012, Springer-Verlag, pp. 9-48.
Li, C. et al., "An efficient augmented Lagrangian method wilh applications to total variation minimization," Computational Optimization and Applications, vol. 56, Issue 3, Dec. 2013, Springer Science+Business Media, 24 pages.
Li, D. et al., "DeepRebirth: Accelerating Deep Neural Network Execution on Mobile Devices," The Thirty-Second AAAI Conference on Artificial Intelligence (AAAI-18), 2018, Association for the Advancement of Artificial Intelligence, pp. 2322-2330.
Ma, S. et al., "An Efficient Algorithm for Compressed MR Imaging using Total Variation and Wavelets," IEEE Conference on Computer Vision and Pattern Recognition (CVPR), Jun. 23-28, 2008, Anchorage, AK, USA, 8 pages.
Metzler, C.A et al., "From Denoising to Compressed Sensing," IEEE Transactions on Information Theory, vol. 52, No. 9, Sep. 2016, IEEE, pp. 5117-5144.
Metzler, C.A., "Learned D-AMP: Principled Neural Network Based Compressive Image Recovery," 31st Conference on Neural Information Processing Systems (NIPS 2017), Dec. 4-9, 2017, Long Beach, CA, USA, 12 pages.
Mousavi, A. et al., "A Deep Learning Approach to Structured Signal Recovery," arXiv: 1508.04065v1, Aug. 17, 2015, 8 pages.
Mousavi, A. et al., "Learning to Invert: Signal Recovery via Deep Convolutional Networks," 2017 IEEE International Conference on Acoustics, Speech and Signal Processing (ICASSP), Mar. 5-9, 2017, New Orleans, LA, USA, IEEE, pp. 2272-2276.
Nam, S. et al., "The cosparse analysis model and algorithms," Applied and Computational Harmonic Analysis, vol. 34, Issue 1, Jan. 2013, Elsevier Inc., pp. 30-56.
Pathak, D. et al., "Context Encoders: Feature Learning by Inpainting," 2016 IEEE Conference on Computer Vision and Pattern Recognition (CVPR), Jun. 27-30, 2016, Las Vegas, NV, USA, IEEE, pp. 2536-2544.
Needell, D. et al., "CoSaMP: Iterative Signal Recovery from Incomplete and Inaccurate Samples," Communications of the ACM, vol. 53, No. 12, Dec. 2010, pp. 93-100.
Noh, H. et al., "Learning Deconvolution Network for Semantic Segmentation," IEEE International Conference on Computer Vision (ICCV), 2015, IEEE, pp. 1520-1528.
Radford, A. et al., "Unsupervised Representation Learning with Deep Convolutional Generative Adversarial Networks," arXiv: 1511.06434v2, Jan. 7, 2016, 16 pages.
Sankaranarayanan, A. et al., "Compressive Acquisition of Linear Dynamical Systems," SIAM Journal on Imaging Sciences, vol. 6, No. 4, 2013, Society for Industrial and Applied Mathematics, pp. 2109-2133.
Sankaranarayanan, A. et al., Video Compressive Sensing for Spatial Multiplexing Cameras Using Motion-Flow Models, SIAM Journal on Imaging Sciences, vol. 8, No. 3, 2015, Society for Industrial and Applied Mathematics, pp. 1489-1518.
Schulter, S. et al., "Fast and Accurate Image Upscaling with Super-Resolution Forests," 2015 IEEE Conference on Computer Vision and Pattern Recognition (CVPR), Jun. 7-12, 2015, Boston, MA, USA, IEEE, pp. 3791-3799.
Snoek, C. et al., "Early versus Late Fusion in Semantic Video Analysis," Proceedings of the 13th ACM International Conference on Multimedia (MM), Nov. 6-11, 2005, Singapore, ACM, 4 pages.
Soomro, K. et al., "UCF101: A Dataset of 101 Human Actions Classes From Videos in The Wild," CRCV-TR-12-01, Nov. 2012, Center for Research in Computer Vision, University of Central Florida, USA, 7 pages.
Srivastava, N. et al., "Unsupervised Learning of Video Representations using LSTMs," Proceedings of the 32nd International Conference on Machine Learning (ICML), 2015, Lille, France, 10 pages.

Tropp, J. et al., "Signal Recovery From Random Measurements Via Orthogonal Matching Pursuit," IEEE Transactions on Information Theory, vol. 53, No. 12, Dec. 2007, IEEE, pp. 4655-4666.
Venugopalan, S. et al., "Sequence to Sequence—Video to Text," IEEE International Conference on Computer Vision (ICCV), Dec. 11-18, 2015, Santiago, Chile, IEEE, pp. 4534-4542.
Wang, Z. et al., "Image Quality Assessment: From Error Visibility to Structural Similarity," IEEE Transactions on Image Processing, vol. 13, No. 4, Apr. 2004, IEEE, 14 pages.
Xu, K. et al., "A Data-Driven Compressive Sensing Framework Tailored for Energy-Efficient Wearable Sensing," The 42nd IEEE International Conference on Acoustics, Speech and Signal Processing (ICASSP), Mar. 2017, IEEE, 6 pages.
Xu, K. et al., "Show, Attend and Tell: Neural Image Caption Generation with Visual Attention," Proceedings of the 32nd International Conference on Machine Learning, 2015, Lille, France, 10 pages.
Yang, J. et al., "Image Super-Resolution Via Sparse Representation," IEEE Transactions on Image Processing, vol. 19, No. 11, Nov. 2010, IEEE, pp. 2861-2873.
Yang, J. et al., Video Compressive Sensing Using Gaussian Mixture Models, IEEE Transactions on Image Processing, vol. 23, No. 11, Nov. 2014, pp. 4863-4878.
Zeiler, M. et al., "Adaptive Deconvolutional Networks for Mid and High Level Feature Learning," 2011 IEEE International Conference on Computer Vision (ICCV), Nov. 6-13, 2011, Barcelona, Spain, IEEE, 8 pages.
Zeiler, M. et al., Visualizing and Understanding Convolutional Networks, In Fleet et al., ECCV 2014, Part I, LNCS 3689, Springer International Publishing, pp. 818-833.
Zeyde, R. et al., "On Single Image Scale-Up Using Sparse-Representations," In Boissonnat, J.D. et al., Curves and Surfaces 2011, LNCS 6920, 2012, Springer-Verlag, pp. 711-730.
Chen, T., et al., "DeepCoder: A Deep Neural Network Based Video Compression," 2017 IEEE, Visual Communications and Image Processing (VCIP), Dec. 10-13, 2017, St. Petersburg, FL, 4 pages.
Kin, C., et al., 'Video Compression Using Recurrent Convolutional Neural Networks, 2017, available at http://cs231n.stanford.edu/reports/2017/pdfs/423.pdf, 6 pages.
Pan, P. et al., "Hierarchical Recurrent Neural Encoder for Video Representation with Application to Captioning," Nov. 2015, available at https://arxiv.org/abs/1511.03476, 10 pages.
Toderici, G., et al., "Full Resolution Image Compression with Recurrent Neural Networks," Jul. 2017, available at https://arxiv.org/abs/1608.05148, 9 pages.
Zuo, Z. et al., "Learning Contextual Dependence with Convolutional Hierarchical Recurrent Neural Networks," Jul. 2016, IEEE Transactions on Image Processing, vol. 25, No. 7, pp. 2983-2996.
Non-Final Office Action for U.S. Appl. No. 16/165,568, mailed Mar. 18, 2020, 15 pages.
Denton, E., et al. "Deep Generative Image Models using a Laplacian Pyramid of Adversarial Networks," arXiv:1506.05751v1, Jun. 18, 2015.
Bahadir, C. et al., "Deep-learning-based Optimization of the Undersampling Pattern in MRI," arXiv:1907.11374v3 [eess.IV], Jun. 18, 2020, 18 pages.
Bahadir, C. et al., "Learning-Based Optimization of the Under-Sampling Pattern in MRI," arXiv:1901.01960v2 [eess.IV], Apr. 30, 2019, 13 pages.
Baldassarre, L. et al., "Learning-Based Compressive Subsampling," arXiv:1510.06188v3 [cs.IT], Mar. 28, 2016, 13 pages.
Behravan, V. et al., "Rate-Adaptive Compressed-Sensing and Sparsity Variance of Biomedical Signals," 2015 IEEE 12th International Conference on Wearable and Implantable Body Sensor Networks (BSN), Jun. 9-12, 2015, Cambridge, MA, USA, IEEE, 6 pages.
Dadkhahi, H. et al., "Masking Schemes for Image Manifolds," 2014 IEEE Workshop on Statistical Signal Processing (SSP), Jun. 29-Jul. 2, 2014, Gold Coast, Australia, IEEE, pp. 252-255.
Gao, Z. et al., "Compressive Sensing Techniques for Next-Generation Wireless Communications," IEEE Wireless Communications, vol. 25, Issue 3, Feb. 8, 2018, IEEE, 10 pages.

(56) References Cited

OTHER PUBLICATIONS

Gozcu, B. et al., "Learning-Based Compressive MRI," IEEE Transactions on Medical Imaging, vol. 37, No. 6, Jun. 2018, IEEE, pp. 1394-1406.
Hong, T. et al., "Optimized structured sparse sensing matrices for compressive sensing," Signal Processing, vol. 159, Jun. 2019, Elsevier, pp. 119-129.
Huijben, B.S. et al., "Deep Probabilistic Subsampling for Task-Adaptive Compressed Sensing," Eighth International Conference on Learning Representations (ICLR 2020), Apr. 26-May 1, 2020, 16 pages.
Krizhevsky, A., "Learning Multiple Layers of Features from Tiny Images," Apr. 8, 2009, available online at https://www.cs.toronto.edu/~kriz/learning-features-2009-TR.pdf, 60 pages.
Leinonen, M. et al., "Distributed Variable-Rate Quantized Compressed Sensing in Wireless Sensor Networks," IEEE 17th International Workshop on Signal Processing Advances in Wireless Communications (SPAWC), Jul. 3-6, 2016, Edinburgh, United Kingdom, IEEE, 5 pages.
Lohit, S. et al., "Convolutional Neural Networks for Noniterative Reconstruction of Compressively Sensed Images," IEEE Transactions on Computational Imaging, vol. 4, No. 3, Sep. 2018, IEEE, pp. 326-340.
Lohit, S. et al., "Rate-Adaptive Neural Networks for Spatial Multiplexers," arXiv:1809.02850v1 [cs.CV], Sep. 8, J018, 12 pages.
Mousavi, A. et al., "DeepCodec: Adaptive Sensing and Recovery via Deep Convolutional Neural Networks," arXiv:1707.03386v1 [stat.ML], Jul. 11, 2017, 8 pages.
Mousavi, A. et al., "A Data-Driven and Distributed Approach to Sparse Signal Representation and Recovery," 7th International Conference on Learning Representations (ICLR 2019), May 6-9, 2019, New Orleans, LA, USA, 13 pages.
Nguyen, D. et al., "Deep Learning Sparse Ternary Projections for Compressed Sensing of Images," 2017 IEEE Global Conference on Signal and Information Processing (GlobalSIP), Nov. 14-16, 2017, Montreal, QC, Canada, IEEE, pp. 1125-1129.
Paszke, A. et al., "Automatic differentiation in PyTorch," 31st Conference on Neural Information Processing Systems (NIPS 2017), Dec. 4-9, 2017, Long Beach, CA, USA, 4 pages.
Safavi, S. et al., "Sparsity-aware adaptive block-based compressive sensing," IET Signal Processing, Jul. 2016, The Institution of Engineering and Technology, 7 pages.
Shi, W. et al., "Scalable Convolutional Neural Network for Image Compressed Sensing," 2019 IEEE/CVF Conference on Computer Vision and Pattern Recognition (CVPR), Jun. 15-20, 2019, Long Beach, CA, USA, IEEE, pp. 12290-12299.
Van Veen, D. et al., "Compressed Sensing with Deep Image Prior and Learned Regularization," arXiv:1806.06438v1 [stat.ML], Jun. 17, 2018, 18 pages.
Wang, Y. et al., "Data-Driven Sampling Matrix Boolean Optimization for Energy-Efficient Biomedical Signal Acquisition by Compressive Sensing," IEEE Transactions on Biomedical Circuits and Systems, vol. 11, No. 2, Nov. 14, 2016, IEEE, pp. 255-266.
Weiss, T. et al., "Learning Fast Magnetic Resonance Imaging," arXiv:1905.09324v1 [eess.IV], May 22, 2019, 12 pages.
Wu, Y. et al., "Deep Compressed Sensing," arXiv:1905.06723v2 [cs.LG], May 18, 2019, 11 pages.
Wu, S. et al., "Learning a Compressed Sensing Measurement Matrix via Gradient Unrolling," arXiv:1806.10175v4 [statML], Jul. 2, 2019, 17 pages.
Xie, R. et al., "Transmission Efficient Clustering Method for Wireless Sensor Networks using Compressive Sensing," IEEE Transactions on Parallel and Distributed Systems, vol. 25, Issue 3, Mar. 2014, IEEE, 11 pages.
Yang, Y. et al., "Deep ADMM-Net for Compressive Sensing MRI," 30th Conference on Neural Information Processing Systems (NIPS 2016), Dec. 2016, Barcelona, Spain, pp. 10-18.
Yao, H. et al., DR 2-Net: Deep Residual Reconstruction Network for image compressive sensing, Neurocomputing, vol. 359, No. 11, Jun. 2019, Elsevier B.V., pp. 483-493.
Yuan, X. et al., "Parallel lensless compressive imaging via deep convolutional neural networks," Optics Express, vol. 26, No. 2, Jan. 22, 2018, Optical Society of America, 16 pages.
Zhang, Z. et al., "ISTA-Net: Interpretable Optimization-Inspired Deep Network for Image Compressive Sensing," 2018 IEEE/CVF Conference on Computer Vision and Pattern Recognition, Jun. 18-23, 2018, Salt Lake City, USA, IEEE, pp. 1828-1837.
Zhao, W. et al., "On-Chip Neural Data Compression Based On Compressed Sensing With Sparse Sensing Matrices," IEEE Transactions on Biomedical Circuits and Systems, vol. 12, No. 1, Feb. 2018, IEEE, pp. 242-254.
Notice of Allowance for U.S. Appl. No. 16/165,568, mailed Oct. 5, 2020, 9 pages.
Badrinarayanan, V. et al., "SegNet: A Deep Convolutional Encoder-Decoder Architecture for Image Segmentation", arXiv, (v1, submitted Nov. 2, 2015), 14 pages, arXiv:1511.00561v1.
Badrinarayanan, V. et al., "SegNet: A Deep Convolutional Encoder-Decoder Architecture for Image Segmentation", arXiv, (v2, submitted Dec. 8, 2015), 14 pages, arXiv:1511.00561v2.
Bahdanau, D. et al., "Neural Machine Translation by Jointly Learning to Algin and Translate", arXiv, (v3, submitted Oct. 7, 2014), 15 pages, arXiv:1409.0473v3.
Bahdanau, D. et al., "Neural Machine Translation by Jointly Learning to Algin and Translate", arXiv, (v4, submitted Dec. 19, 2014), 15 pages, arXiv:1409.0473v4.
Bahdanau, D. et al., "Neural Machine Translation by Jointly Learning to Align and Translate", arXiv, (v1, submitted Sep. 1, 2014), 15 pages, arXiv:1409.0473v1.
Bahdanau, D. et al., "Neural Machine Translation by Jointly Learning to Align and Translate", arXiv, (v2, submitted Sep. 2, 2014), 15 pages, arXiv:1409.0473v2.
Becker, S. et al., "Templates for convex cone problems with applications to sparse signal recovery", Mathematical Programming Computation vol. Jul. 2011, vol. 3, pp. 165-218 <DOI:10.1007/s12532-011-0029-5>.
Burger, H. et al., "Image Denoising: Can Plain Neural Networks Compete with BM3D", 2012 IEEE Conference on Computer Vision and Machine Learning (Providence, RI, Jun. 16-21, 2012), 2012 [Date Added to IEEE Xplore Jul. J012], pp. 2392-2399 <DOI:10.1109/CVPR.2012.6247952>.
Candes, E., "The restricted isometry property and its implications for compressed sensing", Comptes Rendus Mathematique, May 2008 (available online Apr. 2008), vol. 346, No. 9-10, pp. 589-592 <DOI:10.1016/j.crma.2008.03.014>.
Chen, X. et al., "Mind's eye: A recurrent visual representation for image caption generation", 2015 IEEE Conference on Computer Vision and Pattern Recognition (CVPR) (Boston, MA, Jun. 7-12, 2015), 2015 [Date Added to IEEE Xplore: Oct. 2015], pp. 2422-2431 <DOI:10.1109/CVPR.2015.7298856>.
Cho, K. et al., "Learning Phase Representations using RNN Encoder-Decoder for Statistical Machine Translation", arXiv, 9v1, (v1, submitted Jun. 3, 2014), 14 pages, arXiv:1406.1078v1.
Cho, K. et al., "Learning Phase Representations using RNN Encoder-Decoder for Statistical Machine Translation", arXiv, (v2, submitted Jul. 24, 2014), 15 pages, arXiv:1406.1078v2.
Cho, K. et al., "Learning Phase Representations using RNN Encoder-Decoder for Statistical Machine Translation", arXiv, (v3, submitted Sep. 3, 2014), 15 pages, arXiv:1406.1078v3.
Girshick, R. et al., "Rich Feature Hierarchies for Accurate Object Detection and Semantic Segmentation", 2014 IEEE Conference on Computer Vision and Pattern Recognition (Columbus, OH, Jun. 23-28, 2014), 2014 [Date Added to IEEE Xplore Sep. 2014], pp. 580-587 <DOI:10.1109/CVPR.2014.81>.
Graves, A. et al., "Towards End-to-End Speech Recognition with Recurrent Neural Networks", ICML '14: Proceedings of the 31st International Conference on Machine Learning (Beijing, China, Jun. 22-24, 2014), 2014, vol. 32, 9 pages.
Hinton, G. et al., "Deep Neural Networks for Acoustic Modeling in Speech Recognition: The Shared Views of Four Research Groups", IEEE Signal Processing Magazine, Nov. 2012 (Date of Publication Oct. 2012), vol. 29, No. 6, pp. 82-97 <DOI:10.1109/MSP.2012.2205597>.

(56) References Cited

OTHER PUBLICATIONS

Hinton, G. et al., "Reducing the Dimensionality of Data with Neural Networks", Science, Jul. 2006, vol. 313, No. 6786, pp. 504-507 <DOI: 10.1126/science.1127647>.

Iliadis, M. et al.,"Deep Fully-Connected Networks for Video Compressive Sensing", arXiv, (v1, submitted Mar. 16, J016), 13 pages, arXiv:1603.04930v1.

* cited by examiner

FIG. 5A

LAPRAN: A SCALABLE LAPLACIAN PYRAMID RECONSTRUCTIVE ADVERSARIAL NETWORK FOR FLEXIBLE COMPRESSIVE SENSING RECONSTRUCTION

RELATED APPLICATIONS

This application is a divisional application of U.S. patent application Ser. No. 16/745,817, filed Jan. 17, 2020, issued as U.S. Pat. No. 11,468,542, and claims the benefit of provisional patent application Ser. No. 62/794,266, filed Jan. 18, 2019, the disclosures of all which are hereby incorporated herein by reference in their entireties.

GOVERNMENT SUPPORT

This invention was made with government support under contract number 1652038 awarded by the National Science Foundation. The government has certain rights in the invention.

FIELD OF THE DISCLOSURE

This disclosure relates to data compression for high frame rate image and/or video applications.

BACKGROUND

Compressive sensing (CS) is a transformative sampling technique that is more efficient than Nyquist Sampling. Rather than sampling at the Nyquist rate and then compressing the sampled data, CS aims to directly sense signals in a compressed form while retaining the necessary information for accurate reconstruction. The trade-off for the simplicity of encoding is the intricate reconstruction process. Conventional CS reconstruction algorithms are based on either convex optimization or greedy/iterative methods. These methods suffer from three major drawbacks limiting their practical usage.

First, the iterative nature renders these methods computationally intensive and not suitable for hardware acceleration. Second, the widely adopted sparsity constraint assumes the given signal is sparse on a known basis. However, natural images do not have an exactly sparse representation on any known basis (discrete cosine transform (DCT), wavelet, or curvelet). The strong dependency on the sparsity constraint becomes the performance limiting factor of conventional methods. Constructing over-complete dictionaries with deterministic atoms can only moderately relax the constraint, as the learned linear sparsity models are often shallow and thus have limited impact. Third, conventional methods have a rigid structure allowing for reconstruction at a fixed resolution only. The recovery quality cannot be guaranteed when the compression ratio (CR) needs to be compromised due to a limited communication bandwidth or storage space. A better solution is to reconstruct at a compromised resolution while keeping a satisfactory reconstruction signal-to-noise ratio (RSNR) rather than dropping the RSNR for a fixed resolution.

Deep neural networks (DNNs) have been explored recently for learning the inverse mapping of CS. The limitations of existing DNN-based approaches are twofold. First, the reconstruction results tend to be blurry because of the exclusive use of a Euclidean loss. Specifically, the recovery quality of DNN-based methods are usually no better than optimization-based methods when the CR is low, e.g., CR<=10. Second, similar to the optimization-based methods, the existing DNN-based methods all have rigid structures allowing for reconstruction at a fixed and non-adaptive resolution only. The reconstruction will simply fail when the CR is lower than a required threshold.

SUMMARY

This disclosure addresses the single-image compressive sensing (CS) and reconstruction problem. A scalable Laplacian pyramid reconstructive adversarial network (LAPRAN) facilitates high-fidelity, flexible and fast CS image reconstruction. LAPRAN progressively reconstructs an image following the concept of the Laplacian pyramid through multiple stages of reconstructive adversarial networks (RANs). At each pyramid level, CS measurements are fused with a contextual latent vector to generate a high-frequency image residual. Consequently, LAPRAN can produce hierarchies of reconstructed images and each with an incremental resolution and improved quality. The scalable pyramid structure of LAPRAN enables high-fidelity CS reconstruction with a flexible resolution that is adaptive to a wide range of compression ratios (CRs), which is infeasible with existing methods. Experimental results on multiple public datasets show that LAPRAN offers an average 7.47 decibels (dB) and 5.98 dB peak signal to noise ratio (PSNR), and an average 57.93% and 33.20% structural similarity (SSIM) index improvement compared to model-based and data-driven baselines, respectively.

LAPRAN addresses the problems of prior deep neural network (DNN)-based approaches described above. LAPRAN does not require sparsity as prior knowledge and therefore can be potentially used in a broader range of applications, especially where the exact signal sparsity model is unknown. When applied to image signals, LAPRAN progressively reconstructs high-fidelity images following the concept of the Laplacian pyramid through multiple stages of specialized RANs. At each pyramid level, CS measurements are fused with a low-dimensional contextual latent vector to generate a reconstructed image with both higher resolution and reconstruction quality.

The non-iterative and high-concurrency natures of LAPRAN make it suitable for hardware acceleration. Furthermore, the scalable pyramid structure of LAPRAN enables high-fidelity CS reconstruction with a flexible resolution that can be adaptive to a wide range of CRs. One can dynamically add or remove RAN stages from LAPRAN to reconstruct images at a higher or lower resolution when the CR becomes lower and higher, respectively. Therefore, a consistently superior recovery quality can be guaranteed across a wide range of CRs.

The contributions of this disclosure can be summarized as follows:
  A novel architecture of the neural network model (LAPRAN) that enables high-fidelity, flexible and fast CS reconstruction.
  Fusing CS measurements with contextual latent vectors of low-resolution images at each pyramid level to enhance the CS recovery quality.
  The progressive learning and reconstruction strategy can mitigate the difficulty of the inverse mapping problem in CS. Such a strategy not only accelerates the training by confining the search space but also improves the recovery quality by eliminating the accumulation of errors.

An exemplary embodiment provides a method for reconstructing a compressed image. The method includes receiving first compressed image data based on a source image; producing a first reconstruction of the source image at a first resolution from the first compressed image data using a first RAN; receiving second compressed image data based on the source image; and producing a second reconstruction of the source image at a second resolution from the first reconstruction and the second compressed image data using a second RAN.

Another exemplary embodiment provides a method for compressively encoding a source image. The method includes randomly encoding the source image into multi-rate measurements, comprising: producing first compressed image data at a first compression ratio; and producing second compressed image data at a second compression ratio.

Another exemplary embodiment provides an image processing system. The image processing system includes an image reconstruction network, comprising: a first RAN configured to generate a first reconstruction of a source image from first CS data; and a second RAN configured to generate a second reconstruction of the source image from the first reconstruction and second CS data.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

FIG. 5A shows a visual comparison of reconstructed images from a 4-stage embodiment of LAPRAN and several reference methods at a compression ratio (CR) of 5.

DETAILED DESCRIPTION

Figure 1:
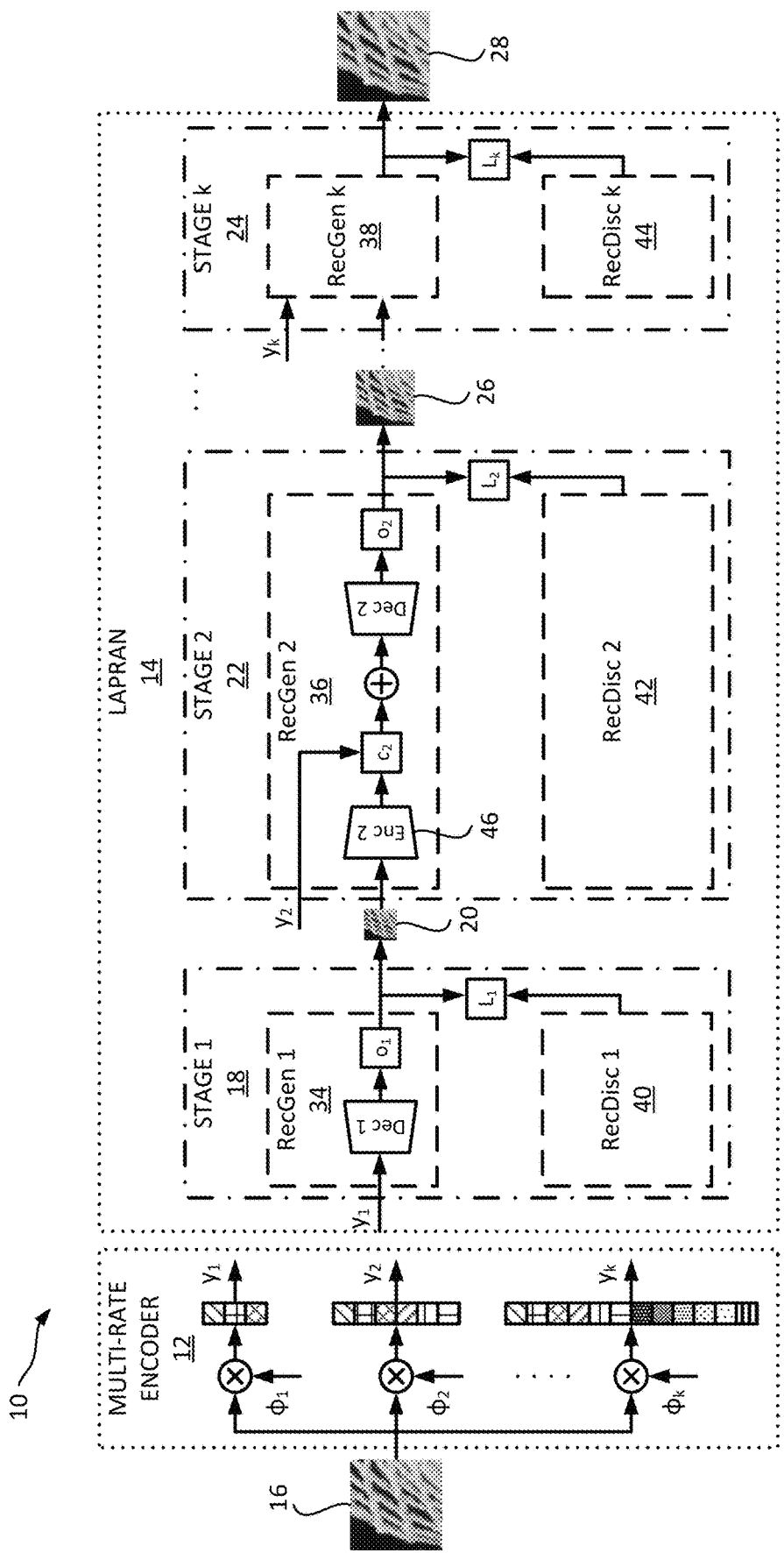
FIG. 1 is a schematic diagram of an exemplary image processing system using a Laplacian pyramid reconstructive adversarial network (LAPRAN) reconstruction approach.

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

This disclosure addresses the single-image compressive sensing (CS) and reconstruction problem. A scalable Laplacian pyramid reconstructive adversarial network (LAPRAN) facilitates high-fidelity, flexible and fast CS image reconstruction. LAPRAN progressively reconstructs an image following the concept of the Laplacian pyramid through multiple stages of reconstructive adversarial networks (RANs). At each pyramid level, CS measurements are fused with a contextual latent vector to generate a high-frequency image residual. Consequently, LAPRAN can produce hierarchies of reconstructed images and each with an incremental resolution and improved quality. The scalable pyramid structure of LAPRAN enables high-fidelity CS reconstruction with a flexible resolution that is adaptive to a wide range of compression ratios (CRs), which is infeasible with existing methods. Experimental results on multiple public datasets show that LAPRAN offers an average 7.47 decibels (dB) and 5.98 dB peak signal to noise ratio (PSNR), and an average 57.93% and 33.20%) structural similarity (SSIM) index improvement compared to model-based and data-driven baselines, respectively.

LAPRAN addresses the problems of prior deep neural network (DNN)-based approaches described above. LAPRAN does not require sparsity as prior knowledge and therefore can be potentially used in a broader range of applications, especially where the exact signal sparsity model is unknown. When applied to image signals, LAPRAN progressively reconstructs high-fidelity images following the concept of the Laplacian pyramid through multiple stages of specialized RANs. At each pyramid level, CS measurements are fused with a low-dimensional contextual latent vector to generate a reconstructed image with both higher resolution and reconstruction quality.

The non-iterative and high-concurrency natures of LAPRAN make it suitable for hardware acceleration. Furthermore, the scalable pyramid structure of LAPRAN enables high-fidelity CS reconstruction with a flexible resolution that can be adaptive to a wide range of CRs. One can dynamically add or remove RAN stages from LAPRAN to reconstruct images at a higher or lower resolution when the CR becomes lower and higher, respectively. Therefore, a consistently superior recovery quality can be guaranteed across a wide range of CRs.

The contributions of this disclosure can be summarized as follows:

- A novel architecture of the neural network model (LAPRAN) that enables high-fidelity, flexible and fast CS reconstruction.
- Fusing CS measurements with contextual latent vectors of low-resolution images at each pyramid level to enhance the CS recovery quality.
- The progressive learning and reconstruction strategy can mitigate the difficulty of the inverse mapping problem in CS. Such a strategy not only accelerates the training by confining the search space but also improves the recovery quality by eliminating the accumulation of errors.

A progressive learning and reconstruction strategy can mitigate the difficulty of the inverse mapping problem in CS. Such a strategy not only accelerates reconstruction engine training by confining the search space but also improves the recovery quality by eliminating the accumulation of errors.

In this regard, CS reconstruction is inherently an under-determined problem. Prior knowledge (e.g., the structure of signals) must be exploited to reduce the information loss after reconstruction. Depending on the approach to applying prior knowledge used, CS reconstruction methods can be grouped into three categories: 1) model-based methods, 2) data-driven methods, 3) hybrid methods.

Model-based CS reconstruction methods mostly rely on a sparsity prior. For example, basis pursuit (BP), least absolute shrinkage and selection operator (LASSO), and least angle regression (LARS) are all based on $l_1$ minimization. Other methods exploit other types of prior knowledge to improve the recovery performance. Nonlocal Low-rank Regularization (NLR-CS) exploits the group sparsity of similar patches. Total Variation minimization by Augmented Lagrangian and Alternating direction Algorithms (TVAL3) and Edge Guided Reconstruction for Compressive Imaging (EdgeCS) use a total variation (TV) regularizer to reconstruct sharper images by preserving edges or boundaries more accurately. Denoising-based Approximate Message Passing (D-AMP) extends approximate message passing (AMP) to employ denoising algorithms for CS recovery. In general, model-based recovery methods suffer from limited reconstruction quality, especially at high CRs, because images, though compressible, are not ideally sparse in any commonly used transform domains. Additional knowledge of the image structure is required to further improve the reconstruction quality. Furthermore, when the number of CS measurements available is lower than the theoretical lower bound, these model-based methods will simply fail the reconstruction.

Instead of specifying prior knowledge explicitly, data-driven methods have been explored to learn signal characteristics implicitly. Two data-driven methods, "ReconNet" and "Deepinverse" have been proposed. Both methods aim to reconstruct image blocks from CS measurements via convolutional neural networks (CNNs). These methods may be more robust to noise and able to recover visually better images than the model-based approaches. However, the major drawback of these methods is the exclusive use of the $l_2$ reconstruction loss for training. As the $l_2$ loss cannot reliably generate shape images, additional loss metrics must be introduced to further improve the reconstruction quality. In addition, the direct mapping from the low-dimensional measurement domain to the high-dimensional image domain is highly under-determined. This under-determined mapping problem in data-driven methods becomes even more notorious as CR increases since the dimension gap between the two domains is enlarged accordingly.

Hybrid methods aim to incorporate the benefits of both model-based and data-driven methods. Such methods first utilize expert knowledge to set up a recovery algorithm and then learn additional knowledge from training data while preserving the model interpretability and performance bounds. Inspired by the D-AMP algorithm, a learned D-AMP (LDAMP) network for CS image reconstruction has been proposed. The iterative D-AMP algorithm is unrolled and combined with a denoising convolutional neural network (DnCNN) that serves as the denoiser in each iteration. The major drawback of this method is its sophisticated and iterative structure prohibits parallel training and efficient hardware acceleration.

Inspired by the success of a generative adversarial network (GAN) for image generation, another proposal, Compressed Sensing using Generative Models (CSGM) uses a pre-trained deep convolutional GAN (DCGAN) for CS reconstruction. This approach finds a latent vector $\hat{z}$ that minimizes the objective $\|AG(z)-y\|^2$, where G, A and z is the generator, sensing matrix, and CS measurements, respectively. The optimal reconstruction result is represented as $G(\hat{z})$.

In contrast, the LAPRAN approach described herein directly synthesizes an image from CS measurements, which alleviates the exploration of an additional latent space. Although both approaches are GAN-based, they represent two fundamentally different CS reconstruction schemes. CSGM is a sparse-synthesize model that approximates an unknown signal as $x=G(z)$, where the sparse coefficient (z) is measured concurrently. LAPRAN is a co-sparse-analysis model that directly synthesizes an unknown signal x from the corresponding CS measurements y according to x=G(y). Hence, the building block of the proposed model is referred to herein as a RAN instead of a GAN. A RAN elegantly approximates the natural image distribution from CS measurement samples, avoiding the detour in the synthesized model. While multiple network propagations are needed to obtain the optimal $\hat{z}$ in CSGM, LAPRAN finishes reconstruction in a single feedforward propagation. Therefore, LAPRAN has lower computational complexity and a faster reconstruction speed.

FIG. 1 is a schematic diagram of an exemplary image processing system 10 using a LAPRAN reconstruction approach. The image processing system 10 includes two functional units: a multi-rate random encoder 12 for sampling and a LAPRAN 14 (e.g., image reconstruction network) for reconstruction. The multi-rate random encoder 12 generates multiple CS measurements with different CRs from a single source image 16. The LAPRAN 14 takes the CS measurements as inputs and progressively reconstructs the source image 16 in multiple hierarchies with incremental resolutions and recovery quality. In a first stage, a first RAN 18 reconstructs a low-resolution (e.g., 8×8) thumbnail 20 of the source image 16. In a second and subsequent stages, another RAN 22, 24 fuses the low-resolution input generated by the previous stage with CS measurements to produce an upsampled reconstructed image 26, 28 (e.g., upsampled by a factor of 2). Therefore, the resolution of the reconstructed image 20, 26, 28 is progressively improved throughout the cascaded RANs 18, 22, 24.

The proposed LAPRAN 14 architecture is highly scalable. One can concatenate more RANs 18, 22, 24 (just like "LEGO" blocks) to gradually increase the resolution of the reconstructed image. Each building block of LAPRAN is detailed below. Further details of an exemplary embodiment of the LAPRAN architecture are provided in Tables 1-8 below. It should be understood that details of the LAPRAN 14 architecture described herein are exemplary in nature and adaptable according to a desired application. For example, embodiments of LAPRAN 14 can adjust the types of layers used in each RAN 18, 22, 24 (described further below with respect to FIG. 3 and Tables 1-8), the parameters of components, and other details to meet user needs and practical concerns for an implementation.

Multi-Rate CS Encoder

With continuing reference to FIG. 1, the multi-rate random encoder 12 is used for CS sampling. Given an input image, the encoder generates multiple CS measurements $\{y_1, y_2, \ldots, y_k\}$ simultaneously, each having a different dimension. The generated measurements are fed into each stage of the RANs 18, 22, 24 as input, i.e. $\{y_1, y_2, \ldots, y_k\}$, is forward to {first RAN 18, second RAN 22, ..., kth RAN 24}, respectively. According to the rate-distortion theory, the minimum bit-rate is positively related to the reconstruction quality, which indicates that the i-th RAN requires more information than all the previous RANs in order to improve the image resolution by adding finer details incrementally.

The quantitative analysis of the number of measurements required for each RAN 18, 22, 24 is as follows. Let A be an m×n sensing matrix that satisfies the restricted isometry property (RIP) of order 2k, and the isometry constant is $$\delta_{2k} \in \left(0, \frac{1}{2}\right).$$

According to CS theory, the lower bound of the number of CS measurements required for satisfying RIP is defined as:

$$m \geq Ck\log\left(\frac{n}{k}\right),$$

where $$C = \frac{1}{2}\log(\sqrt{24} + 1) \approx 0.28.$$

In the CS image reconstruction problem, let the number of input measurements required by two adjacent RANs (e.g., 18, 22) for accurately reconstructing a N×N image and a 2N×2N image is m1 and m2, respectively, the measurement increment ratio can be defined as $= \frac{m2}{m1}$.

If the sparsity ratio $$\left(\frac{k}{n}\right)$$

of the two images is assumed to remain constant across the two adjacent RANs, then can be calculated as:

$$\beta = \frac{4k \times \log[(2N \times 2N)/4k]}{k \times \log[(N \times N)/k]} = 4 \qquad \text{Equation 1}$$

Equation 1 indicates that the number of CS measurements (as well as CR) required for a former RAN should be at least ¼ of a latter one in order to guarantee a satisfactory reconstruction performance. One should note that β=4 is the upper bound, lower values can be used to offer better reconstruction performance at the cost of collecting more CS measurements in early stages. In an exemplary aspect, is set to 2 in order to set a gradually increasing CR at different stages instead of using a unified CR. Since the dimension of a measurement vector equals the number of rows in a sensing matrix, the k sensing matrices in FIG. 1 have the following dimensions: $\phi \in R^{m \times N}$, $\phi_2 \in R^{[\beta m] \times N}$, $\phi_k \in R^{[\beta^{k-1}m] \times N}$.

Figure 2:
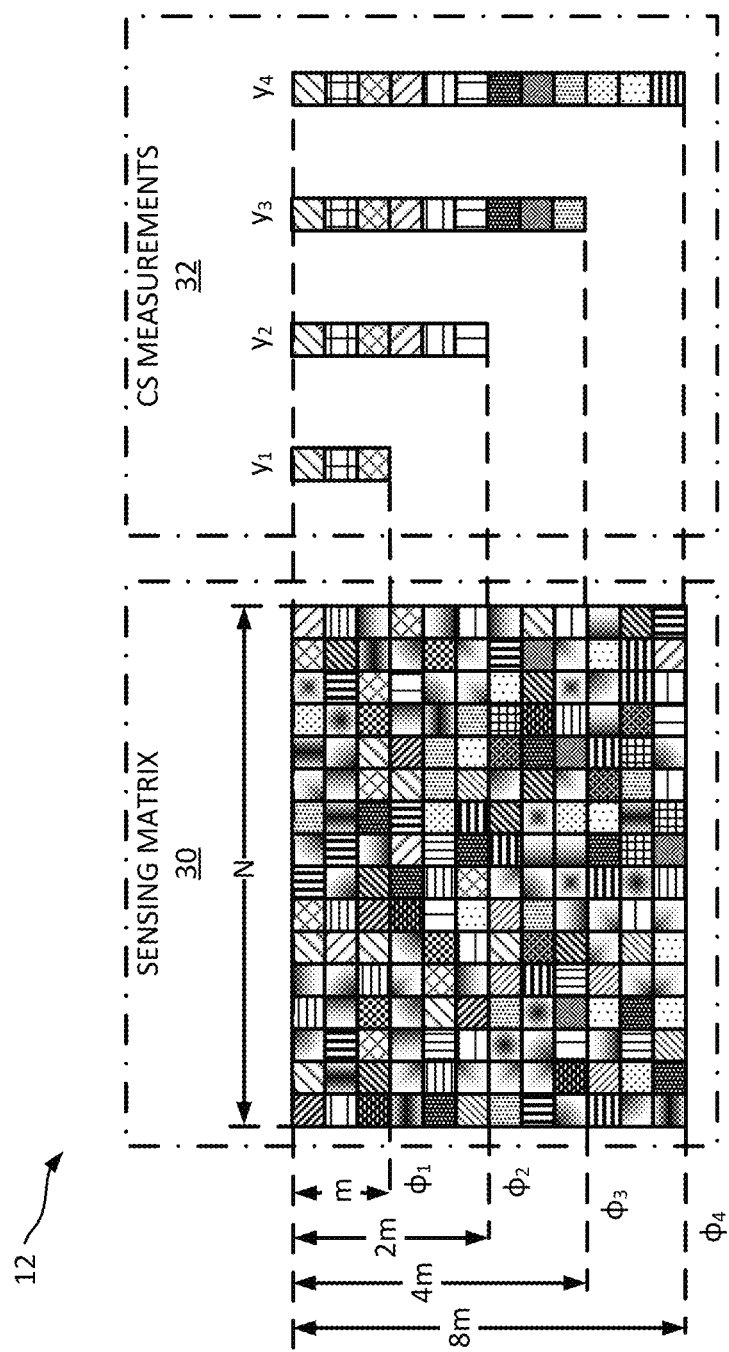
FIG. 2 illustrates an exemplary sensing matrix for the multi-rate encoder of an exemplary 4-stage embodiment of the image processing system of FIG. 1.

FIG. 2 illustrates an exemplary sensing matrix 30 for the multi-rate random encoder 12 of an exemplary 4-stage embodiment of the image processing system 10 of FIG. 1. The generated measurements 32 ($y_1 \in R^m$, $y_2 \in R^{2m}$, $y_3 \in R^{4m}$, $y_4 \in R^{8m}$) are used as inputs to a first RAN (e.g., 18), a second RAN (e.g., 22), a third RAN, and a fourth RAN, respectively. With respect to a k-stage LAPRAN 14, only $y_k$ needs to be generated for training. Since $y_i$ is always a subset of $y_{i+1}$, the first $[\beta^{i-1}m]$ elements of $y_k$ can be fed to the i-th stage in a backward fashion.

The proposed LAPRAN enables CS reconstruction with a flexible resolution, which is not feasible with existing methods. When the number of CS measurements fails to meet the required threshold, the existing methods will fail to reconstruct with no room for maneuver. However, the proposed method can still reconstruct lower-resolution previews of the image with less detail in cases where the CS measurements are insufficient. The output of each RAN constitutes an image pyramid, providing the user with great flexibility in choosing the desired resolution of reconstructed images. Accordingly, the sensing matrix 30 is scalable to a given application, and can include fewer or additional measurements to meet user demands and practical concerns or limitations.

RAN for CS Image Reconstruction

With further reference to FIG. 1, a RAN 18, 22, 24 at each pyramid level generates the reconstructed image with a fixed resolution. A RAN 18, 22, 24 is composed of a reconstructive generator denoted as "RecGen" 34, 36, 38, and a discriminator denoted as "RecDisc" 40, 42, 44. The structure of the RecGen 34, 36, 38 is specially customized for reconstruction.

Figure 3:
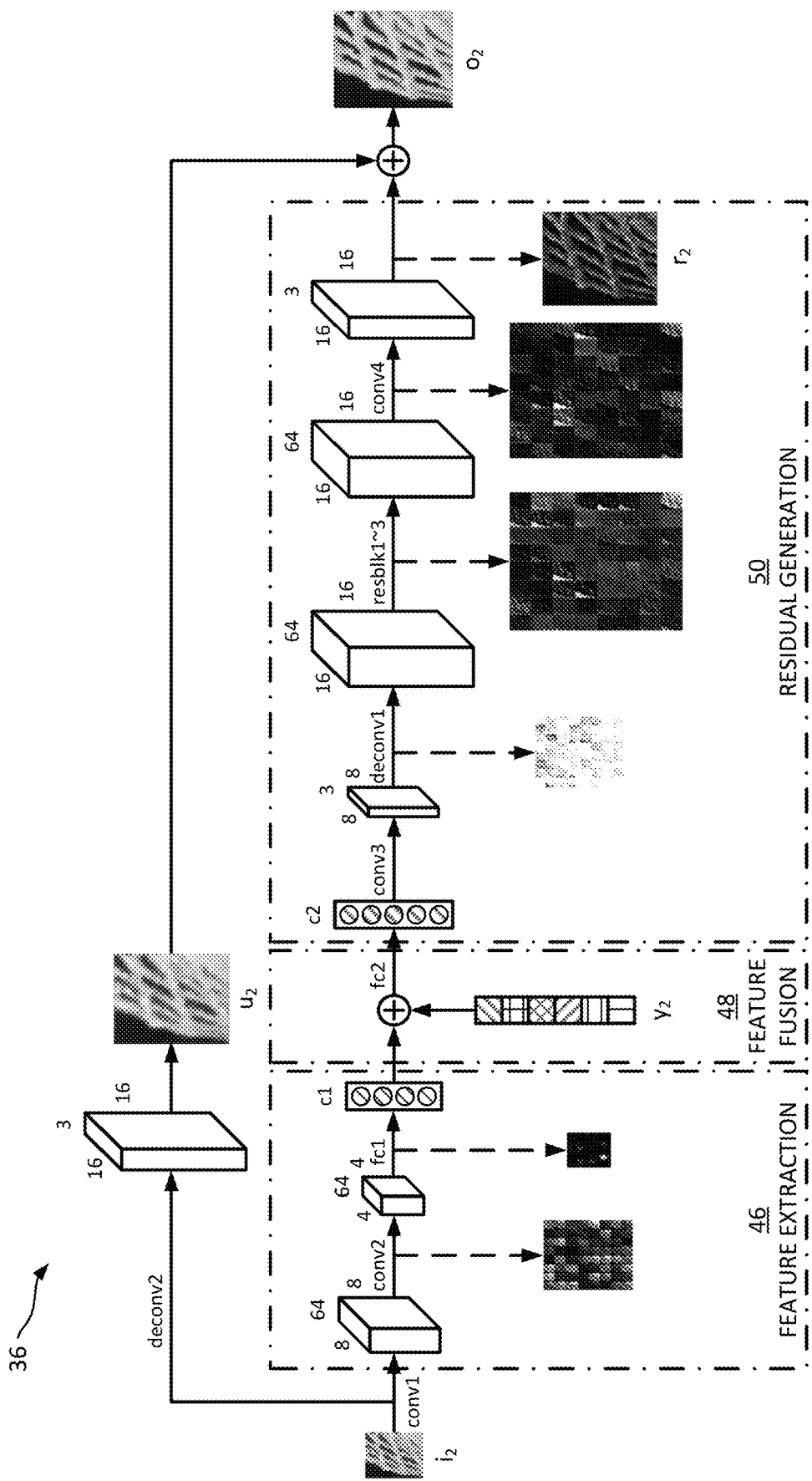
FIG. 3 is a schematic diagram of an exemplary reconstructive generator (RecGen) for a second reconstructive adversarial network (RAN) of FIG. 1.

FIG. 3 is a schematic diagram of an exemplary RecGen2 36 for the second RAN 22 of FIG. 1. Taking the RecGen2 36 in the second RAN 22 as an example, $\{i_2, r_2, u_2, o_2\}$ are the contextual input from the previous stage, image residual, upscaled input, and output image, respectively. $y_2$ is the input measurements generated by the multi-rate random encoder 12. The RecGen2 36 is composed of two branches: 1) an upper branch that generates an upscaled input image $u_2$ via a deconvolutional neural network (deconv2); and 2) a lower branch that generates an image residual $r_2$ to compensate for the artifacts introduced by the upper branch. Note that $u_2$ is upscaled from a lower-resolution image, thus $u_2$ lacks high-frequency components and only provides a coarse approximation to the higher-resolution ground-truth image. It is the addition of the high-frequency residual $r_2$ that recovers the entire frequency range of the image, thus substantially improving the reconstruction quality.

The input $i_2$ is treated as a low-resolution context for generating the residual image $r_2$. First, at operation 46, an encoder extracts a contextual latent vector $c_1$ to represent the low-resolution context $i_2$. The encoder is composed of two convolutional layers and a fully-connected layer. To guarantee an equal contribution to the feature after fusion, the contextual latent vector $c_1$ has the same dimension as the CS measurement $y_2$. It should be noted that by increasing the dimension of $c_1$, one can expect more image patterns coming from the contextual input to appear in the final reconstruction, and vice versa.

At operation 48, the contextual latent vector $c_1$ is fused with the CS measurement $y_2$ through concatenation (referred to as "early fusion") in a feature space. The fully-connected layer is used to transform the fused vector back to a feature map that has the same dimension as the contextual input $i_2$.

A common practice of upscaling is to use an unpooling layer or interpolation layer (bilinear, bicubic, or nearest neighbor). However, these methods are either non-invertible or non-trainable. Instead, at operation 50, a deconvolutional layer deconv1 is used to learn the upsampling of the fused feature map. Three residual blocks (resblk1~3) are set up to process the upsampled feature map to generate 50 the image residual $r_2$, which is later combined with $u_2$ generated by the upper branch (deconv2) to form the final output image.

Learning from context. Instead of reconstructing the original image from CS measurements directly, the low-resolution context ($i_2$ in FIG. 3) is exploited to condition for reconstruction. The proposed conditional reconstruction scheme is fundamentally different from the conventional methods that solely rely on CS measurements. The reason is as follows.

Learning the inverse reconstructive mapping is a highly under-determined problem, hence notoriously difficult to solve. Each pixel value must be accurately predicted in an exceptionally high-dimensional space. All the existing data-driven methods directly search in such a vast space and try to establish a direct mapping from the low-dimensional CS measurements to the high-dimensional ground-truth. The intricacy of the problem and the lack of additional constraints make the search process inefficient and untrustworthy. Instead, embodiments of LAPRAN 14 delegate the low-resolution context to confine the sub-search space, such that the candidates that are far from the context in the search space may be obviated. In addition, the CS measurements supplement the necessary information needed for recovering the entire frequency spectrum of the image. The fusion of the context and CS measurements hence improves both convergence speed and recovery accuracy.

Residual learning. In embodiments of LAPRAN 14, the RecGen 34, 36, 38 of each RAN 18, 22, 24 includes at least one convolutional layer. All the convolutional layers are followed by a spatial batch normalization (BN) layer and a rectified linear unit (ReLU) except for the output layer. The output layer uses a Tanh activation function to ensure the output image has pixel values in the range of [0, 255]. The use of BN and normalized weight initialization alleviates the problem of vanishing or exploding gradients hence improve both convergence accuracy and speed.

It should be understood that the RecGen2 36 of FIG. 3 is exemplary in nature, providing a flexible architecture for multi-stage image reconstruction. For example, the layers and parameters illustrated in FIG. 3 may be deployed differently in other embodiments of LAPRAN 14 in order to meet demands of a particular application and/or based on the resources available.

Cascaded RANs for Flexible CS Reconstruction

The existing DNN-based methods all have rigid structures allowing for reconstruction with a fixed CR and at a non-adaptive resolution only. Under these approaches, a new model must be retrained from scratch when a different CR is used in the encoding process. Inspired by the self-similarity based super resolution (SR) method, a flexible CS reconstruction approach is realized for the LAPRAN 14 by dynamically cascading multiple RANs 18, 22, 24 (see FIG. 1) at runtime.

Upon training, each RAN 18, 22, 24 corresponds to a specific resolution of the reconstructed image as well as an upper bound of the CR needed for accurate reconstruction. The thresholds of CR at different stages should be determined from experiments given a target accuracy metric. At runtime, depending on the CR of inputs, only the RANs with a higher CR threshold are enabled for reconstruction. As a result, the proposed LAPRAN can perform high-fidelity CS reconstruction with a flexible resolution that is adaptive to a wide range of CRs. This merit is particularly significant to the CS application scenarios, where the CR must be adaptive to the dynamic requirements of storage space or communication bandwidth. When the CR is compromised in such an application scenario, all the existing methods will fail the reconstruction, while the proposed LAPRAN 14 can still reconstruct an accurate preview of the image at a reduced resolution.

Another advantage of the proposed LAPRAN 14 is that its hierarchical structure reduces the difficulty of training. CS reconstruction is a highly under-determined problem that has a very large space for searching. Therefore, it is very challenging for a single network to approximate the intricate model of the inverse mapping accurately. Adopting a divide-and-conquer strategy, embodiments of the image processing system 10 of FIG. 1 divide a highly under-determined problem into a series of lightly under-determined problems and conquer them in multiple hierarchies. As the dimensionality gap between the input and output in each sub-problem is significantly reduced, the difficulty for learning each mapping is much reduced compared to the original problem.

In addition, since the hierarchical structure leverages a series of upsampling operations, error accumulation occurs at each stage. To alleviate such a problem, a loss function is defined to perform back-propagation per stage independently. The training error is effectively reduced after each stage compared to the case that a single back-propagation is performed at the final output. The injected CS measurements at each pyramid level are the key for CS reconstruction, which distinguishes the proposed approach from image SR methods.

SR models are responsible for inferring high-frequency components which are non-existent in the input. From the frequency perspective, SR models should be adequately non-linear to compensate for the frequency gap, which inevitably results in complicated structures. However, the proposed approach incorporates new information provided by CS measurements into the image reconstruction at each stage. The CS measurements supplement necessary information needed for recovering the entire frequency spectrum of an image, which is a powerful information source for learning visual representations. Consequently, both the resolution and the quality of the reconstructed images increase across different stages in the proposed approach.

Figure 4A:
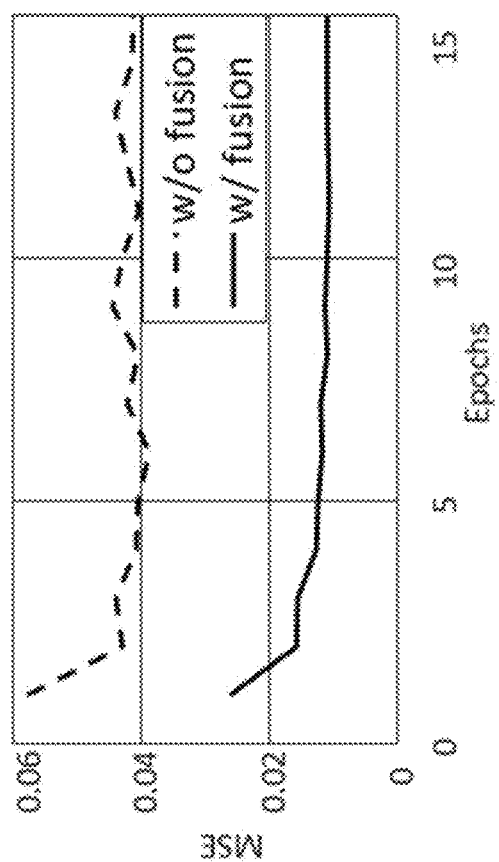
FIG. 4A is a graphical representation of mean squared error (MSE) as a function of epochs at a first stage of an exemplary 4-stage LAPRAN.
Figure 4B:
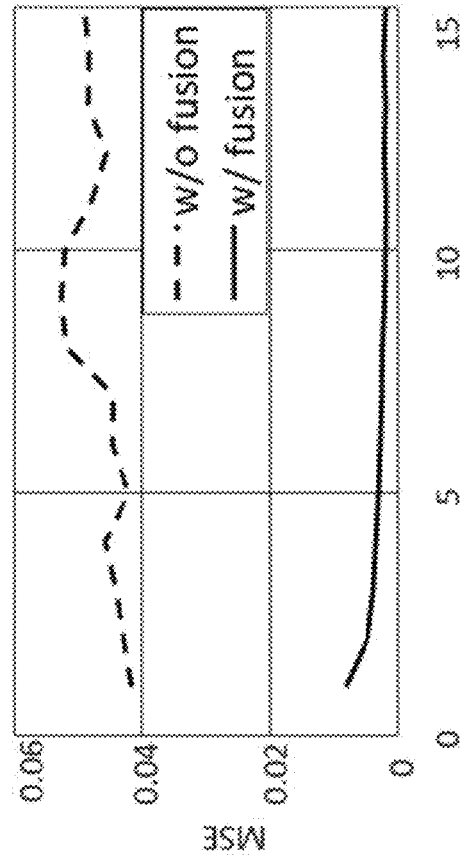
FIG. 4B is a graphical representation of MSE as a function of epochs at a second stage of the exemplary 4-stage LAPRAN.
Figure 4C:
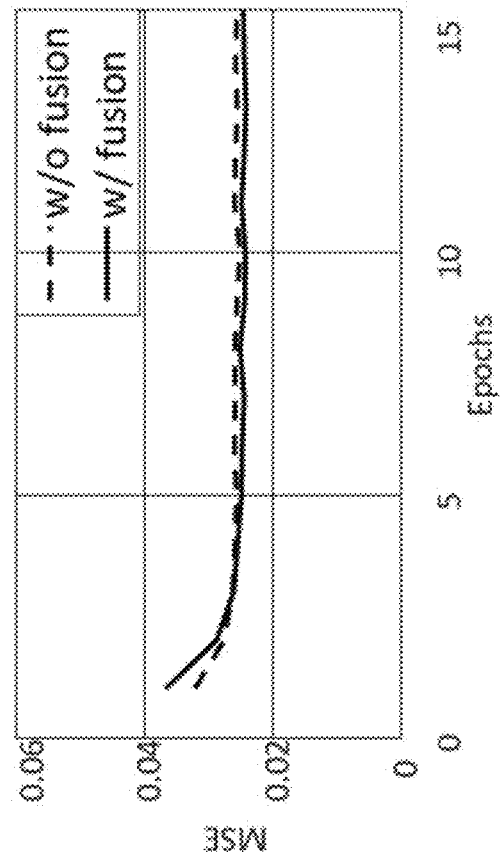
FIG. 4C is a graphical representation of MSE as a function of epochs at a third stage of the exemplary 4-stage LAPRAN.
Figure 4D:
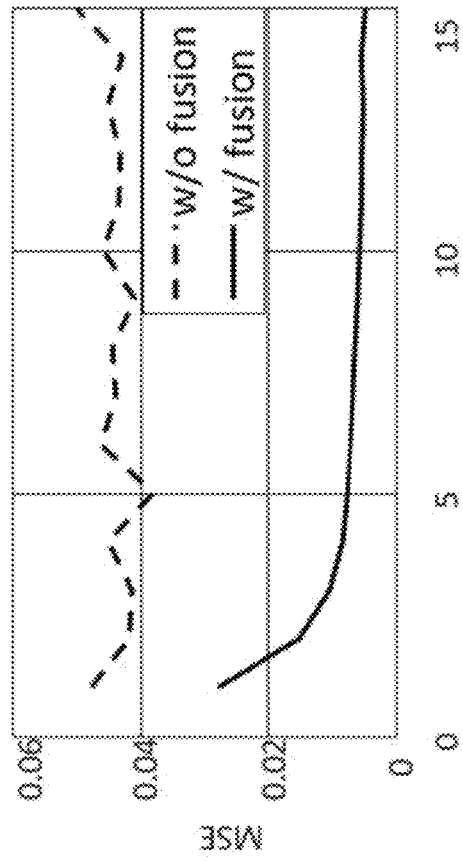
FIG. 4D is a graphical representation of MSE as a function of epochs at a fourth stage of the exemplary 4-stage LAPRAN.

FIGS. 4A-4D illustrate a convergence analysis for embodiments of the LAPRAN 14 as compared with a variant that has no fusion mechanism implemented at each stage (e.g., an SR counterpart). FIG. 4A is a graphical representation of mean squared error (MSE) as a function of epochs at a first stage of an exemplary 4-stage LAPRAN 14. FIG. 4B is a graphical representation of MSE as a function of epochs at a second stage of the exemplary 4-stage LAPRAN 14. FIG. 4C is a graphical representation of MSE as a function of epochs at a third stage of the exemplary 4-stage LAPRAN 14. FIG. 4D is a graphical representation of MSE as a function of epochs at a fourth stage of the exemplary 4-stage LAPRAN 14. It is apparent from this analysis that the reconstruction accuracy of the proposed LAPRAN is consistently improved stage by stage, while the SR counterpart suffers from limited performance improvement.

Reconstruction Loss

A pixel-wise $l_2$ reconstruction loss and an adversarial loss are used for training. The $l_2$ loss finds an overall structure of a reconstructed image. The adversarial loss picks up a particular mode from the image distribution and generates a more authentic output. The overall loss function is defined as follows:

$$z \sim Enc(z|x_l), x_h = G(y|z),$$

$$L_{adv}(G,D) = E_{x_h}[\log D(x_h|z)] + E_y[\log(1-D(G(y|z)))],$$

$$L_{euc} = E_{x_h}[\|x_h - x_G\|_2],$$

$$L_{total} = \lambda_{adv} L_{adv} + \lambda_{euc} L_{euc} \quad \text{Equation 2}$$

where $x_l$, $x_h$, $x_G$, and y are the low-resolution input image, the high-resolution output image, the ground-truth image, and the CS measurement, respectively. The encoder function (Enc) maps a low-resolution input $x_l$ to a distribution over a contextual latent vector z.

Training

The training of each RAN 18, 22, 24 is performed individually and sequentially. Training begins with the first stage and the output is used as the input for the second stage. The training of all the subsequent stages is performed in such a sequential fashion. Motivated by the fact that the RANs 18, 22, 24 in different stages share a similar structure but with different output dimensionality, the training of each stage is initialized with the pre-trained weights of the previous stage to take advantage of transfer learning. Such a training scheme is shown in experiments to be more stable and has faster convergence than those with static initialization (such as Gaussian or Xavier). In addition, the weight transfer between adjacent stages helps to tackle the notorious mode collapse problem in GAN since the pre-trained weights already cover the diversity existed in training images. It is recommended to leverage weight transfer to facilitate the training of the remaining RANs.

Performance Evaluation

In this section, the performance of the proposed image processing system 10 of FIG. 1 is evaluated. First, the datasets used for training and testing are described. Then, the parameters used for training are provided. Finally, an exemplary embodiment is compared with state-of-the-art CS reconstruction methods.

Network Architecture: A 4-stage LAPRAN was implemented for CS image reconstruction. The detailed network architecture of RecGen1, RecDisc1, RecGen2, RecDisc2, RecGen3, RecDisc3, RecGen4 and RecDisc4 is shown in Tables 1-8, respectively. It should be understood that these parameters can be adjusted in other embodiments to meet demands with available resources.

TABLE 1

Network structure for RecGen1

| Layer Name | Output Size | Kernel | Stride | Pad |
|---|---|---|---|---|
| Input | 3 × 51 | | | |
| Reshape | 153 | | | |
| Linear | 4096 | | | |
| Reshape | 64 × 8 × 8 | | | |
| conv1 | 64 × 8 × 8 | 3,3 | 1,1 | 1,1 |
| bn1 | 64 × 8 × 8 | | | |
| Resblk | 64 × 8 × 8 | | | |
| conv2 | 3 × 8 × 8 | 3,3 | 1,1 | 1,1 |
| tanh | 3 × 8 × 8 | | | |

TABLE 2

Network structure for RecDisc1

| Layer Name | Output Size | Kernel | Stride | Pad |
|---|---|---|---|---|
| Input | 3 × 8 × 8 | | | |
| conv1 | 32 × 8 × 8 | 3,3 | 1,1 | 1,1 |
| bn1 | 32 × 8 × 8 | | | |
| conv2 | 32 × 4 × 4 | 3,3 | 2,2 | 1,1 |
| bn2 | 32 × 4 × 4 | | | |
| conv3 | 64 × 4 × 4 | 3,3 | 1,1 | 1,1 |
| bn3 | 64 × 4 × 4 | | | |
| conv4 | 1 | 4,4 | 1,1 | 0,0 |

TABLE 3

Network structure for RecGen2

| Layer Name | Output Size | Kernel | Stride | Pad |
|---|---|---|---|---|
| Input | 3 × 8 × 8 | | | |
| conv1 | 64 × 8 × 8 | 3,3 | 1,1 | 1,1 |
| bn1 | 64 × 8 × 8 | | | |
| conv2 | 64 × 4 × 4 | 3,3 | 2,2 | 1,1 |
| bn2 | 64 × 4 × 4 | | | |
| Reshape1 | 1024 | | | |
| Linear1 | 306 | | | |
| Fuse | 612 | | | |
| Linear2 | 4096 | | | |
| Reshape2 | 64 × 8 × 8 | | | |
| Deconv1 | 64 × 16 × 16 | 4,4 | 2,2 | 1,1 |
| Resblk | 64 × 16 × 16 | | | |
| conv3 | 3 × 16 × 16 | 3,3 | 1,1 | 1,1 |
| tanh | 3 × 16 × 16 | | | |

TABLE 4

Network structure for RecDisc2

| Layer Name | Output Size | Kernel | Stride | Pad |
|---|---|---|---|---|
| Input | 3 × 16 × 16 | | | |
| conv1 | 32 × 16 × 16 | 3,3 | 1,1 | 1,1 |
| bn1 | 32 × 16 × 16 | | | |
| conv2 | 32 × 8 × 8 | 3,3 | 2,2 | 1,1 |
| bn2 | 32 × 8 × 8 | | | |
| conv3 | 64 × 8 × 8 | 3,3 | 1,1 | 1,1 |
| bn3 | 64 × 8 × 8 | | | |
| conv4 | 64 × 4 × 4 | 3,3 | 2,2 | 1,1 |
| bn4 | 64 × 4 × 4 | | | |
| conv5 | 128 × 4 × 4 | 3,3 | 1,1 | 1,1 |
| bn5 | 128 × 4 × 4 | | | |
| conv6 | 1 | 4,4 | 1,1 | 0,0 |

TABLE 5

Network structure for RecGen3

| Layer Name | Output Size | Kernel | Stride | Pad |
|---|---|---|---|---|
| Input | 3 × 16 × 16 | | | |
| conv1 | 64 × 16 × 16 | 3,3 | 1,1 | 1,1 |
| bn1 | 64 × 16 × 16 | | | |
| conv2 | 64 × 8 × 8 | 3,3 | 2,2 | 1,1 |
| bn2 | 64 × 8 × 8 | | | |
| Reshape1 | 4096 | | | |
| Linear1 | 612 | | | |
| Fuse | 1224 | | | |
| Linear2 | 16384 | | | |
| Reshape2 | 64 × 16 × 16 | | | |
| Deconv1 | 64 × 32 × 32 | 4,4 | 2,2 | 1,1 |
| Resblk | 64 × 32 × 32 | | | |
| conv3 | 3 × 32 × 32 | 3,3 | 1,1 | 1,1 |
| tanh | 3 × 32 × 32 | | | |

TABLE 6

Network structure for RecDisc3

| Layer Name | Output Size | Kernel | Stride | Pad |
|---|---|---|---|---|
| Input | 3 × 32 × 32 | | | |
| conv1 | 32 × 32 × 32 | 3,3 | 1,1 | 1,1 |
| bn1 | 32 × 32 × 32 | | | |
| conv2 | 32 × 16 × 16 | 3,3 | 2,2 | 1,1 |
| bn2 | 32 × 16 × 16 | | | |
| conv3 | 64 × 16 × 16 | 3,3 | 1,1 | 1,1 |
| bn3 | 64 × 16 × 16 | | | |
| conv4 | 64 × 8 × 8 | 3,3 | 2,2 | 1,1 |
| bn4 | 64 × 8 × 8 | | | |
| conv5 | 128 × 8 × 8 | 3,3 | 1,1 | 1,1 |
| bn5 | 128 × 8 × 8 | | | |
| conv6 | 128 × 4 × 4 | 3,3 | 2,2 | 1,1 |
| bn6 | 128 × 4 × 4 | | | |
| conv7 | 256 × 4 × 4 | 3,3 | 1,1 | 1,1 |
| bn7 | 256 × 4 × 4 | | | |
| conv8 | 1 | 4,4 | 1,1 | 0,0 |

TABLE 7

Network structure for RecGen4

| Layer Name | Output Size | Kernel | Stride | Pad |
|---|---|---|---|---|
| Input | 3 × 32 × 32 | | | |
| conv1 | 64 × 32 × 32 | 3,3 | 1,1 | 1,1 |
| bn1 | 64 × 32 × 32 | | | |
| conv2 | 64 × 16 × 16 | 3,3 | 2,2 | 1,1 |
| bn2 | 64 × 16 × 16 | | | |
| Reshape1 | 16384 | | | |
| Linear1 | 1227 | | | |
| Fuse | 2354 | | | |
| Linear2 | 65536 | | | |
| Reshape2 | 64 × 32 × 32 | | | |
| Deconv1 | 64 × 64 × 64 | 4,4 | 2,2 | 1,1 |
| Resblk | 64 × 64 × 64 | | | |
| conv3 | 3 × 64 × 64 | 3,3 | 1,1 | 1,1 |
| tanh | 3 × 64 × 64 | | | |

TABLE 8

Network structure for RecDisc4

| Layer Name | Output Size | Kernel | Stride | Pad |
|---|---|---|---|---|
| Input | 3 × 64 × 64 | | | |
| conv1 | 32 × 64 × 64 | 3,3 | 1,1 | 1,1 |
| bn1 | 32 × 64 × 64 | | | |
| conv2 | 32 × 32 × 32 | 3,3 | 2,2 | 1,1 |
| bn2 | 32 × 32 × 32 | | | |
| conv3 | 64 × 32 × 32 | 3,3 | 1,1 | 1,1 |
| bn3 | 64 × 32 × 32 | | | |
| conv4 | 64 × 16 × 16 | 3,3 | 2,2 | 1,1 |
| bn4 | 64 × 16 × 16 | | | |
| conv5 | 128 × 16 × 16 | 3,3 | 1,1 | 1,1 |
| bn5 | 128 × 16 × 16 | | | |
| conv6 | 128 × 8 × 8 | 3,3 | 2,2 | 1,1 |
| bn6 | 128 × 8 × 8 | | | |
| conv7 | 256 × 8 × 8 | 3,3 | 1,1 | 1,1 |
| bn7 | 256 × 8 × 8 | | | |
| conv8 | 256 × 4 × 4 | 3,3 | 2,2 | 1,1 |
| bn8 | 256 × 4 × 4 | | | |
| conv9 | 512 × 4 × 4 | 3,3 | 1,1 | 1,1 |
| bn9 | 512 × 4 × 4 | | | |
| conv10 | 1 | 4,4 | 1,1 | 0,0 |

Datasets and Training Setup: The 4-stage embodiment of LAPRAN was trained and evaluated with three widely used bench-marking datasets. The first two are the Modified National Institute of Standards and Technology database (MNIST) and the Canadian Institute For Advanced Research-10 database (CIFAR-10). The third dataset is made following the rule used in prior SR work, which uses 91 images from Yang et al. and 200 images from the Berkeley Segmentation Dataset (BSD). The 291 images are augmented (rotation and flip) and cut into 228, 688 patches as the training data. Set5 and Set14 are pre-processed using the same method and used for testing.

Each training image was resized to 64×64, and the entire 4-stage embodiment of LAPRAN was trained with a batch size of 128 for 100 epochs with early stopping. Adam solver was used with a learning rate of $1 \times 10^{-4}$. The training took roughly two days on a single NVidia Titan×GPU.

Comparisons with State-of-the-art: The 4-stage embodiment of LAPRAN is compared with six state-of-the-art CS reconstruction methods: NLR-CS, TVAL3, D-AMP with a block-matching and 3D filtering (BM3D) denoiser (BM3D-AMP), ReconNet, CSGM, and LDAMP. All methods are summarized in Table 9. Structural similarity (SSIM) and peak signal-to noise ratio (PSNR) are used as the performance metrics in the benchmarking.

TABLE 9

Summary of the major differences between the proposed and the reference methods

| Name | Model/Data Driven | Iterative? | Reconstruction | Loss |
|---|---|---|---|---|
| NLR-CS | Model | Yes | Direct | Group sparsity, low rank |
| TVAL3 | Model | Yes | Direct | $l_2$, TV |
| D-AMP | Model | Yes | Direct | Denoising |
| ReconNet | Data | No | Direct | $l_2$ |
| LDAMP | Hybrid | Yes | Direct | Denoising |
| CSGM | Data | No | Direct | $l_2$, Adversarial |
| LAPRAN | Data | No | Direct | $l_2$, Adversarial |

The quantitative comparison of reconstruction performance is shown in Table 10. The 4-stage embodiment of LAPRAN achieves the best recovery quality on all the testing datasets and at all CRs. Especially, the performance degradation of the embodiment of LAPRAN at large CRs (>20) is well bounded. The main reasons are twofold. First, this approach adopts a progressive reconstruction strategy that greatly mitigates the difficulty of approximating the inverse mapping of CS. In contrast, CSGM tries to generate high-resolution images in a single step thus has a low reconstruction quality due to the difficulty in learning. Second, this approach utilizes a low-resolution image as input to guide the generation process at each stage, which helps to further reduce the search space of the underdetermined problem by eliminating irrelevant candidates.

TABLE 10

Quantitative evaluation of state-of-the-art CS reconstruction methods

| Algorithm | CR | MNIST SSIM | MNIST PSNR | CIFAR10 SSIM | CIFAR10 PSNR | Set5 SSIM | Set5 PSNR | Set14 SSIM | Set14 PSNR |
|---|---|---|---|---|---|---|---|---|---|
| NLR-CS | 5 | 0.408 | 24.85 | 0.868 | 37.91 | 0.803 | 30.402 | 0.794 | 29.42 |
| D-AMP | | 0.983 | 37.78 | 0.968 | 41.35 | 0.852 | 33.74 | 0.813 | 31.17 |
| TVAL-3 | | 0.934 | 36.39 | 0.847 | 32.03 | 0.812 | 31.54 | 0.727 | 29.48 |
| ReconNet | | 0.911 | 29.03 | 0.871 | 32.55 | 0.824 | 31.78 | 0.763 | 29.70 |
| CSGM | | 0.748 | 28.94 | 0.788 | 30.34 | 0.619 | 27.31 | 0.575 | 26.18 |
| LDAMP | | 0.797 | 31.93 | 0.971 | 41.54 | 0.866 | 32.26 | 0.781 | 30.07 |
| LAPRAN | | 0.993 | 38.46 | 0.978 | 42.39 | 0.895 | 34.79 | 0.834 | 32.71 |
| NLR-CS | 10 | 0.416 | 21.98 | 0.840 | 33.39 | 0.764 | 28.89 | 0.716 | 27.47 |
| D-AMP | | 0.963 | 35.51 | 0.822 | 30.78 | 0.743 | 27.72 | 0.649 | 25.84 |
| TVAL-3 | | 0.715 | 27.18 | 0.746 | 29.21 | 0.702 | 28.29 | 0.615 | 26.65 |
| ReconNet | | 0.868 | 28.98 | 0.843 | 29.78 | 0.779 | 29.53 | 0.704 | 27.45 |
| CSGM | | 0.589 | 27.49 | 0.784 | 29.83 | 0.560 | 25.82 | 0.514 | 24.94 |
| LDAMP | | 0.446 | 22.40 | 0.899 | 34.56 | 0.796 | 29.46 | 0.687 | 27.70 |
| LAPRAN | | 0.990 | 38.38 | 0.943 | 38.13 | 0.849 | 32.53 | 0.775 | 30.45 |
| NLR-CS | 20 | 0.497 | 21.79 | 0.820 | 31.27 | 0.729 | 26.73 | 0.621 | 24.88 |
| D-AMP | | 0.806 | 28.56 | 0.402 | 16.86 | 0.413 | 16.72 | 0.329 | 15.12 |
| TVAL-3 | | 0.494 | 21.00 | 0.623 | 25.77 | 0.583 | 25.18 | 0.513 | 24.19 |
| ReconNet | | 0.898 | 27.92 | 0.806 | 29.08 | 0.731 | 27.07 | 0.623 | 25.38 |
| CSGM | | 0.512 | 27.54 | 0.751 | 30.50 | 0.526 | 25.04 | 0.484 | 24.42 |
| LDAMP | | 0.346 | 17.01 | 0.756 | 28.66 | 0.689 | 27.00 | 0.591 | 24.48 |
| LAPRAN | | 0.985 | 37.02 | 0.896 | 34.12 | 0.801 | 30.08 | 0.716 | 28.39 |
| NLR-CS | 30 | 0.339 | 17.47 | 0.703 | 27.26 | 0.580 | 22.93 | 0.581 | 22.93 |
| D-AMP | | 0.655 | 21.47 | 0.183 | 10.62 | 0.230 | 10.88 | 0.136 | 9.31 |
| TVAL-3 | | 0.381 | 18.17 | 0.560 | 24.01 | 0.536 | 24.04 | 0.471 | 23.20 |
| ReconNet | | 0.892 | 25.46 | 0.777 | 29.32 | 0.623 | 25.60 | 0.598 | 24.59 |
| CSGM | | 0.661 | 27.47 | 0.730 | 27.73 | 0.524 | 24.92 | 0.464 | 23.97 |
| LDAMP | | 0.290 | 15.03 | 0.632 | 25.57 | 0.572 | 24.75 | 0.510 | 22.74 |
| LAPRAN | | 0.962 | 31.28 | 0.840 | 31.47 | 0.693 | 28.61 | 0.668 | 27.09 |

Figure 5A:
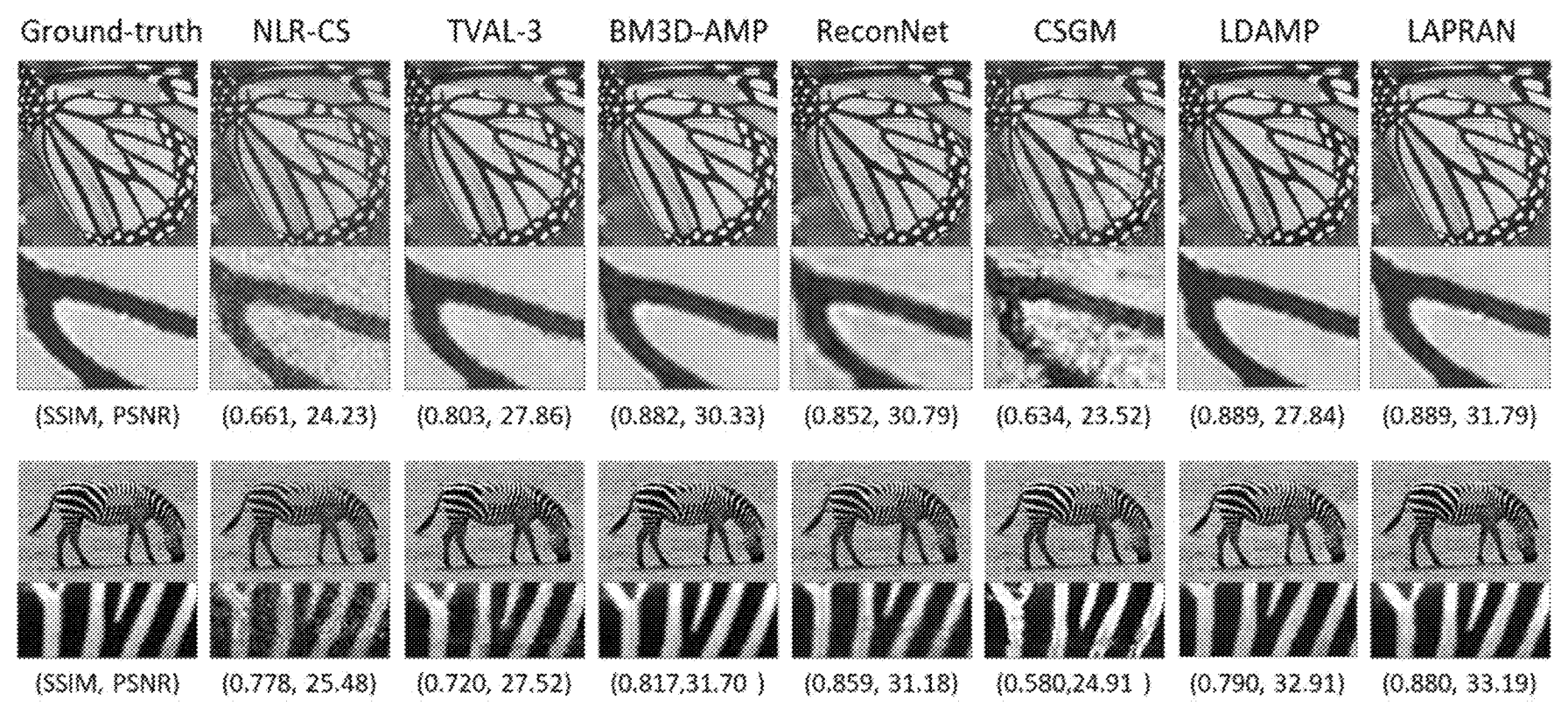
Figure 5B:
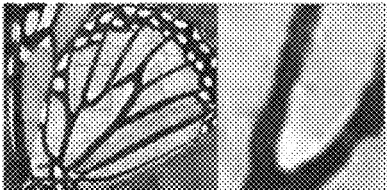
FIG. 5B shows a visual comparison of reconstructed images from the 4-stage embodiment of LAPRAN and the reference methods at a CR of 20.

FIG. 5A shows a visual comparison of reconstructed images from the 4-stage embodiment of LAPRAN and several reference methods at a CR of 5. FIG. 5B shows a visual comparison of reconstructed images from the 4-stage embodiment of LAPRAN and the reference methods at a CR of 20. The visual comparison includes reconstructed images of a butterfly (Set5) and a zebra (Set14). As shown, the LAPRAN approach can accurately reconstruct high-frequency details, such as parallel lines, contained in a ground-truth image. In contrast, the reference methods produce noticeable artifacts and start to lose details at the CR of 20.

Reconstruction Speed

The runtime of each reconstruction method for reconstructing 64×64 image patches is compared to benchmark reconstruction speed. For the optimization-based methods, GPU acceleration is ineffective due to their iterative nature. Thus, an Intel Xeon E5-2695 CPU was used to run the codes. For the DNN-based methods, an Nvidia GTX TitanX GPU was used to accelerate the reconstruction process. The average runtime for each method is shown in Table 11.

Unlike the model-based methods, the runtime of the 4-stage embodiment of LAPRAN is invariant to CR. This embodiment is slightly slower than ReconNet because of its large model capacity. CSGM and LDAMP are relatively slow due to their iterative nature.

TABLE 11

Runtime (seconds) for reconstructing a 64 × 64 image patch

| Name | Device | CR = 5 | CR = 10 | CR = 20 | CR = 30 |
|---|---|---|---|---|---|
| NLR-CS | CPU | 1.869e1 | 1.867e1 | 1.833e1 | 1.822e1 |
| TVAL3 | CPU | 1.858e1 | 1.839e1 | 1.801e1 | 1.792e1 |
| BM3D-AMP | CPU | 4.880e−1 | 4.213e−1 | 3.018e−1 | 2.409e−1 |
| ReconNet | GPU | 2.005e−3 | 1.703e−3 | 1.524e−3 | 1.661e−3 |
| CSGM | GPU | 1.448e−1 | 1.125e−1 | 9.089e−2 | 8.592e−2 |
| LDAMP | GPU | 3.556e−1 | 2.600e−1 | 1.998e−1 | 1.784e−1 |
| LAPRAN | GPU | 6.241e−3 | 6.384e−3 | 6.417e−3 | 6.008e−3 |

The 4-stage embodiment of LAPRAN takes about 6 milliseconds (ms) to reconstruct a 64×64 image patch, which is four orders of magnitude faster than NLR-CS and TVAL3, and two orders of magnitude faster than BM3D-AMP, LDAMP and CSGM. As described above, both LDAMP and CSGM are hybrid methods that must solve a convex CS recovery problem. In each iteration, the DNN is propagated to provide a solution for a sub-problem. Therefore, multiple propagations are performed to obtain a single reconstruction, which explains why both LDAMP and CSGM are two orders of magnitude slower than LAPRAN. In comparison with ReconNet, LAPRAN sacrifices minor reconstruction speed for an apparent improvement in recovery quality (improves about 3-10 dB PSNR). The 4-stage embodiment of LAPRAN is still sufficiently fast for performing real-time CS reconstruction.

Computer System

Figure 6:
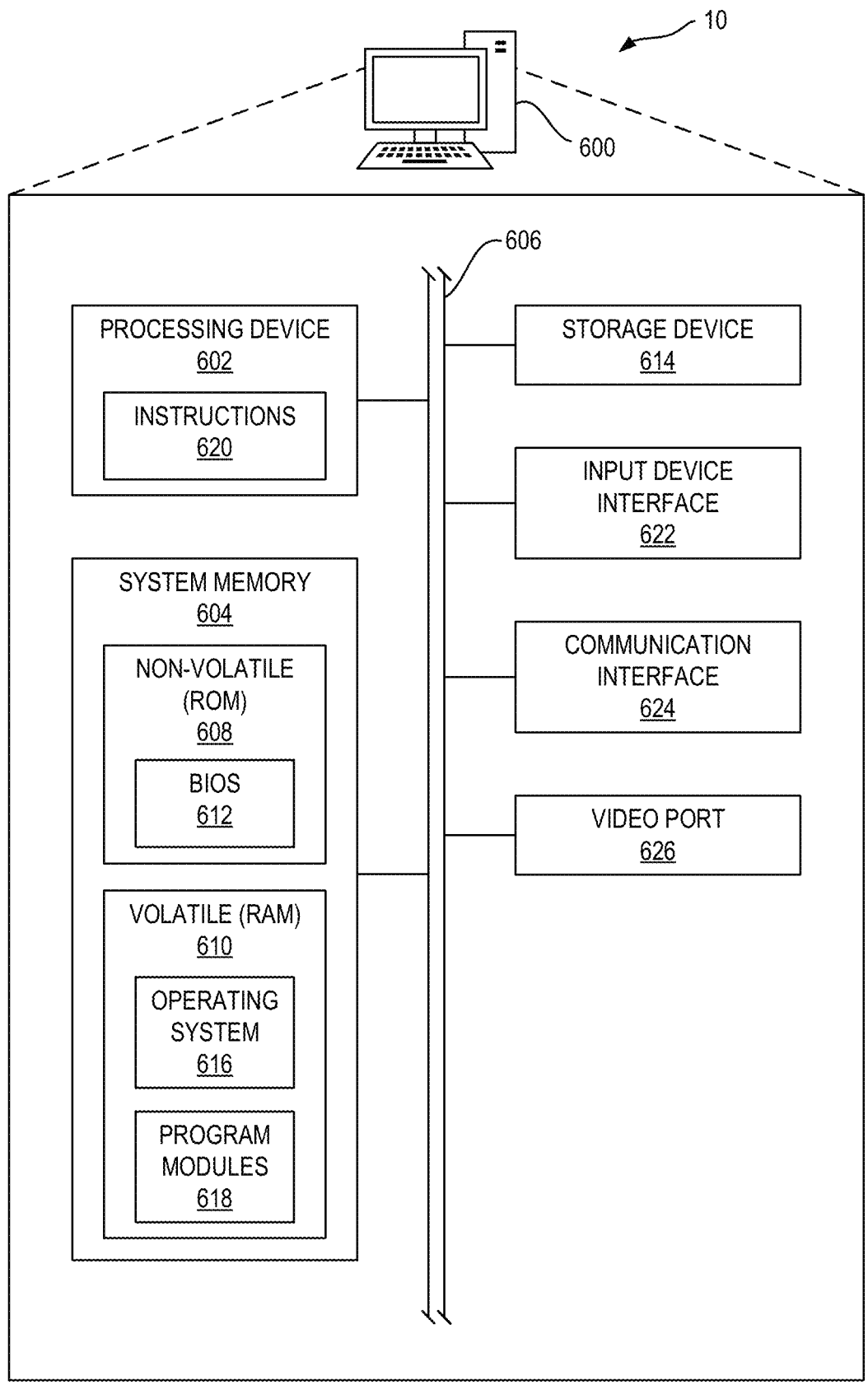
FIG. 6 is a block diagram of the image processing system of FIG. 1 suitable for implementing the multi-rate random encoder and/or the LAPRAN (e.g., image reconstruction network) according to embodiments disclosed herein.

FIG. 6 is a block diagram of the image processing system 10 of FIG. 1 suitable for implementing the multi-rate random encoder 12 and/or the LAPRAN 14 (e.g., image reconstruction network) according to embodiments disclosed herein. The image processing system 10 includes or is implemented as a computer system 600, which comprises any computing or electronic device capable of including firmware, hardware, and/or executing software instructions that could be used to perform any of the methods or functions described above, such as compressively encoding a source image and/or reconstructing a compressed image. In this regard, the computer system 600 may be a circuit or circuits included in an electronic board card, such as a printed circuit board (PCB), a server, a personal computer, a desktop computer, a laptop computer, an array of computers, a personal digital assistant (PDA), a computing pad, a mobile device, or any other device, and may represent, for example, a server or a user's computer.

The exemplary computer system 600 in this embodiment includes a processing device 602 or processor, a system memory 604, and a system bus 606. The system memory 604 may include non-volatile memory 608 and volatile memory 610. The non-volatile memory 608 may include read-only memory (ROM), erasable programmable read-only memory (EPROM), electrically erasable programmable read-only memory (EEPROM), and the like. The volatile memory 610 generally includes random-access memory (RAM) (e.g., dynamic random access memory (DRAM), such as synchronous DRAM (SDRAM)). A basic input/output system (BIOS) 612 may be stored in the non-volatile memory 608 and can include the basic routines that help to transfer information between elements within the computer system 600.

The system bus 606 provides an interface for system components including, but not limited to, the system memory 604 and the processing device 602. The system bus 606 may be any of several types of bus structures that may further interconnect to a memory bus (with or without a memory controller), a peripheral bus, and/or a local bus using any of a variety of commercially available bus architectures.

The processing device 602 represents one or more commercially available or proprietary general-purpose processing devices, such as a microprocessor, central processing unit (CPU), or the like. More particularly, the processing device 602 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processing device 602 is configured to execute processing logic instructions for performing the operations and steps discussed herein.

In this regard, the various illustrative logical blocks, modules, and circuits described in connection with the embodiments disclosed herein may be implemented or performed with the processing device 602, which may be a microprocessor, field programmable gate array (FPGA), a digital signal processor (DSP), an application-specific integrated circuit (ASIC), or other programmable logic device, a discrete gate or transistor logic, discrete hardware components, or any combination thereof designed to perform the functions described herein. Furthermore, the processing device 602 may be a microprocessor, or may be any conventional processor, controller, microcontroller, or state machine. The processing device 602 may also be implemented as a combination of computing devices (e.g., a combination of a DSP and a microprocessor, a plurality of microprocessors, one or more microprocessors in conjunction with a DSP core, or any other such configuration).

The computer system 600 may further include or be coupled to a non-transitory computer-readable storage medium, such as a storage device 614, which may represent an internal or external hard disk drive (HDD), flash memory, or the like. The storage device 614 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as optical disks, magnetic cassettes, flash memory cards, cartridges, and the like, may also be used in the operating environment, and, further, that any such media may contain computer-executable instructions for performing novel methods of the disclosed embodiments.

An operating system 616 and any number of program modules 618 or other applications can be stored in the volatile memory 610, wherein the program modules 618 represent a wide array of computer-executable instructions corresponding to programs, applications, functions, and the like that may implement the functionality described herein in whole or in part, such as through instructions 620 on the processing device 602. The program modules 618 may also reside on the storage mechanism provided by the storage device 614. As such, all or a portion of the functionality described herein may be implemented as a computer program product stored on a transitory or non-transitory computer-usable or computer-readable storage medium, such as the storage device 614, volatile memory 608, non-volatile memory 610, instructions 620, and the like. The computer program product includes complex programming instructions, such as complex computer-readable program code, to cause the processing device 602 to carry out the steps necessary to implement the functions described herein.

An operator, such as the user, may also be able to enter one or more configuration commands to the computer system 600 through a keyboard, a pointing device such as a mouse, or a touch-sensitive surface, such as the display device, via an input device interface 622 or remotely through a web interface, terminal program, or the like via a communication interface 624. The communication interface 624 may be wired or wireless and facilitate communications with any number of devices via a communications network in a direct or indirect fashion. An output device, such as a display device, can be coupled to the system bus 606 and driven by a video port 626. Additional inputs and outputs to the computer system 600 may be provided through the system bus 606 as appropriate to implement embodiments described herein.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined.

CONCLUSION

This disclosure presents a scalable image processing system using LAPRAN for high-fidelity, flexible, and fast CS image reconstruction. LAPRAN consists of multiple stages of RANs that progressively reconstruct an image in multiple hierarchies. At each pyramid level, CS measurements are fused with a low-dimensional contextual latent vector to generate a high-frequency image residual, which is subsequently upsampled via a transposed CNN. The generated image residual is then added to a low-frequency image upscaled from the output of the previous level to form the final output of the current level with both higher resolution and reconstruction quality. The hierarchical nature of LAPRAN is the key to enabling high-fidelity CS reconstruction with a flexible resolution that can be adaptive to a wide range of CRs. Each RAN in embodiments of LAPRAN can be trained independently with weight transfer to achieve faster convergence and improved accuracy. Leveraging the contextual input at each stage and the divide-and-conquer strategy in training are the keys to achieving excellent reconstruction performance.

Those skilled in the art will recognize improvements and modifications to the preferred embodiments of the present disclosure. All such improvements and modifications are considered within the scope of the concepts disclosed herein and the claims that follow.

What is claimed is:

1. A method for compressively encoding a source image, the method comprising:
   randomly encoding the source image into multi-rate measurements, from which compressed image data is obtained, the randomly encoding comprising:
   producing first compressed image data at a first compression ratio; and
   producing second compressed image data at a second compression ratio; and
   providing the compressed image data to a system configured to reconstruct the source from the compressed image data by performing actions comprising:
   inputting the first compressed image data to a first reconstructive adversarial network (RAN), from which a first reconstruction of the source image at a first resolution is obtained; and
   inputting the first reconstruction and the second compressed image data to a second RAN, from which a second reconstruction of the source image at a second resolution is obtained.

2. The method of claim 1, wherein the first compressed image data is produced using a first sensing matrix $\phi_1$.

3. The method of claim 2, wherein the second compressed image data is produced using a second sensing matrix $\phi_2$.

4. The method of claim 3, wherein the second sensing matrix $\phi_2$ includes the first sensing matrix $\phi_1$.

5. The method of claim 1, wherein randomly encoding the source image into the multi-rate measurements further comprises, for each of k image reconstruction stages, wherein k is an integer, producing i-th compressed image data at an i-th compression ratio, wherein i is an integer.

6. The method of claim 5, wherein each i-th compressed image data comprises a smaller number of compressive sensing measurements than each (i+1)-th compressed image data.

7. The method of claim 6, wherein each i-th compressed image data comprises at least ¼ the number of compressive sensing measurements of each (i+1)-th compressed image data.

8. The method of claim 6, wherein each i-th compressed image data comprises ½ the number of compressive sensing measurements of each (i+1)-th compressed image data.

* * * * *